(12) United States Patent
Keeth et al.

(10) Patent No.: US 6,374,360 B1
(45) Date of Patent: Apr. 16, 2002

(54) METHOD AND APPARATUS FOR BIT-TO-BIT TIMING CORRECTION OF A HIGH SPEED MEMORY BUS

(75) Inventors: Brent Keeth; Terry R. Lee, both of Boise; Kevin Ryan, Eagle; Troy A. Manning, Meridian, all of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/209,587

(22) Filed: Dec. 11, 1998

(51) Int. Cl.[7] ............................................... G06F 1/12
(52) U.S. Cl. ....................................................... 713/400
(58) Field of Search ................................... 713/400, 40

(56) References Cited

U.S. PATENT DOCUMENTS

| 3,633,174 A | 1/1972 | Griffin ...................... 340/172.5 |
| 4,077,016 A | 2/1978 | Sanders et al. ................. 331/4 |
| 4,096,402 A | 6/1978 | Schroeder et al. .......... 307/362 |
| 4,404,474 A | 9/1983 | Dingwall .................... 307/260 |
| 4,481,625 A | 11/1984 | Roberts et al. ................ 370/85 |

(List continued on next page.)

FOREIGN PATENT DOCUMENTS

| EP | 0 171 720 A2 | 8/1985 |
| EP | 0 295 515 A1 | 12/1988 |
| EP | 0 406 786 A1 | 1/1991 |
| EP | 0 450 871 A2 | 10/1991 |
| EP | 0 476 585 A3 | 3/1992 |

(List continued on next page.)

OTHER PUBLICATIONS

Gustavson, David B., et al, *IEEE Standard for Scalable Coherent Interface (SCI)*, IEEE Computer Society, IEEE Std 1596–1992, Aug. 2, 1993.

Alvarez, J. et al. "A Wide–Bandwidth Low Voltage PLL for PowerPC ™ Microprocessors" IEEE IEICE Trans. Electron., vol. E–78. No. 6, Jun. 1995, pp. 631–639.

(List continued on next page.)

*Primary Examiner*—Thomas M. Heckler
(74) *Attorney, Agent, or Firm*—Dorsey & Whitney LLP

(57) ABSTRACT

A synchronization circuit performs bit-to-bit timing correction of respective digital signals in digital signal packets applied to a packetized memory device. Each digital signal packet includes a plurality of digital signals applied to respective latches. A clock generator circuit generates a plurality of internal clock signals responsive to the external clock signal, each internal clock signal having a corresponding phase relative to the external clock signal. A plurality of selection circuits applies respective internal clock signals to respective latches in response to a phase command signal. An evaluation circuit receives digital signals sequentially stored in a selected one of the latches and generates a results signal indicating whether each of the digital signals has an expected value. A control circuit sequentially selects the latches and operates for each selected latch to adjust the phase command signals applied to the selection circuit coupled to the selected latch and store respective results signals sequentially received from the evaluation circuit for each phase command signal. The control circuit generates a final phase command signal from the stored results signals and applies each final phase command signal to the corresponding selection circuit. Each of the final phase command signals adjusts the phase of clock signal applied to the associated latch relative to the digital signal applied to the latch so that the digital signal is successfully captured responsive to the clock signal.

79 Claims, 9 Drawing Sheets

U.S. PATENT DOCUMENTS

| | | | |
|---|---|---|---|
| 4,508,983 A | 4/1985 | Allgood et al. | 307/577 |
| 4,511,846 A | 4/1985 | Nagy et al. | 328/164 |
| 4,514,647 A | 4/1985 | Shoji | 307/269 |
| 4,524,448 A | 6/1985 | Hullwegen | 375/118 |
| 4,573,017 A | 2/1986 | Levine | 327/114 |
| 4,600,895 A | 7/1986 | Landsman | 331/1 A |
| 4,603,320 A | 7/1986 | Farago | 341/89 |
| 4,638,187 A | 1/1987 | Boler et al. | 307/451 |
| 4,638,451 A | 1/1987 | Hester et al. | 395/889 |
| 4,687,951 A | 8/1987 | McElroy | 307/269 |
| 4,773,085 A | 9/1988 | Cordell | 375/120 |
| 4,789,796 A | 12/1988 | Foss | 307/443 |
| 4,818,995 A | 4/1989 | Takahashi et al. | 341/94 |
| 4,893,087 A | 1/1990 | Davis | 328/14 |
| 4,902,986 A | 2/1990 | Lesmeister | 331/25 |
| 4,953,128 A | 8/1990 | Kawai et al. | 365/194 |
| 4,958,088 A | 9/1990 | Farah-Bakhsh et al. | 307/443 |
| 4,972,470 A | 11/1990 | Farago | 380/3 |
| 4,984,204 A | 1/1991 | Sato et al. | 365/189.11 |
| 5,020,023 A | 5/1991 | Smith | 364/900 |
| 5,038,115 A | 8/1991 | Myers et al. | 331/2 |
| 5,075,569 A | 12/1991 | Branson | 327/407 |
| 5,086,500 A | 2/1992 | Greub | 395/550 |
| 5,087,828 A | 2/1992 | Sato et al. | 307/269 |
| 5,122,690 A | 6/1992 | Bianchi | 307/475 |
| 5,128,560 A | 7/1992 | Chern et al. | 307/475 |
| 5,128,563 A | 7/1992 | Hush et al. | 307/482 |
| 5,134,311 A | 7/1992 | Biber et al. | 307/270 |
| 5,150,186 A | 9/1992 | Pinney et al. | 357/42 |
| 5,165,046 A | 11/1992 | Hesson | 307/270 |
| 5,179,298 A | 1/1993 | Hirano et al. | 307/443 |
| 5,194,765 A | 3/1993 | Dunlop et al. | 307/443 |
| 5,212,601 A | 5/1993 | Wilson | 360/51 |
| 5,220,208 A | 6/1993 | Schenck | 307/443 |
| 5,223,755 A | 6/1993 | Richley | 307/603 |
| 5,233,314 A | 8/1993 | McDermott et al. | 331/17 |
| 5,233,564 A | 8/1993 | Ohshima et al. | 365/230.05 |
| 5,239,206 A | 8/1993 | Yanai | 307/272.2 |
| 5,243,703 A | 9/1993 | Farmwald et al. | 395/325 |
| 5,254,883 A | 10/1993 | Horowitz et al. | 307/443 |
| 5,256,989 A | 10/1993 | Parker et al. | 331/1 A |
| 5,257,294 A | 10/1993 | Pinto et al. | 375/120 |
| 5,268,639 A | 12/1993 | Gasbarro et al. | 324/158 R |
| 5,272,729 A | 12/1993 | Bechade et al. | 375/118 |
| 5,274,276 A | 12/1993 | Casper et al. | 307/443 |
| 5,276,642 A | 1/1994 | Lee | 365/189.04 |
| 5,278,460 A | 1/1994 | Casper | 307/296.5 |
| 5,281,865 A | 1/1994 | Yamashita et al. | 307/279 |
| 5,283,631 A | 2/1994 | Koerner et al. | 307/451 |
| 5,289,580 A | 2/1994 | Latif et al. | 395/883 |
| 5,295,164 A | 3/1994 | Yamamura | 375/120 |
| 5,304,952 A | 4/1994 | Quiet et al. | 331/1 A |
| 5,311,481 A | 5/1994 | Casper et al. | 365/230.06 |
| 5,311,483 A | 5/1994 | Takasugi | 365/233 |
| 5,313,431 A | 5/1994 | Uruma et al. | 365/230.05 |
| 5,315,388 A | 5/1994 | Shen et al. | 348/718 |
| 5,321,368 A | 6/1994 | Hoelzle | 328/63 |
| 5,337,285 A | 8/1994 | Ware et al. | 365/227 |
| 5,341,405 A | 8/1994 | Mallard, Jr. | 375/120 |
| 5,347,177 A | 9/1994 | Lipp | 307/443 |
| 5,347,179 A | 9/1994 | Casper et al. | 307/451 |
| 5,355,391 A | 10/1994 | Horowitz et al. | 375/36 |
| 5,361,002 A | 11/1994 | Casper | 327/530 |
| 5,367,649 A | 11/1994 | Cedar | 395/384 |
| 5,379,299 A | 1/1995 | Schwartz | 370/108 |
| 5,390,308 A | 2/1995 | Ware et al. | 395/400 |
| 5,400,283 A | 3/1995 | Raad | 365/203 |
| 5,402,389 A | 3/1995 | Flannagan et al. | 365/233 |
| 5,408,640 A | 4/1995 | MacIntyre et al. | 395/550 |
| 5,410,263 A | 4/1995 | Waizman | 327/141 |
| 5,416,436 A | 5/1995 | Rainard | 327/270 |
| 5,416,909 A | 5/1995 | Long et al. | 395/856 |
| 5,420,544 A | 5/1995 | Ishibashi | 331/11 |
| 5,428,311 A | 6/1995 | McClure | 327/276 |
| 5,428,317 A | 6/1995 | Sanchez et al. | 331/1 A |
| 5,430,408 A | 7/1995 | Ovens et al. | 327/407 |
| 5,430,676 A | 7/1995 | Ware et al. | 365/189.02 |
| 5,432,823 A | 7/1995 | Gasbarro et al. | 375/356 |
| 5,438,545 A | 8/1995 | Sim | 365/189.05 |
| 5,440,260 A | 8/1995 | Hayashi et al. | 327/278 |
| 5,440,514 A | 8/1995 | Flannagan et al. | 365/194 |
| 5,444,667 A | 8/1995 | Obara | 365/194 |
| 5,446,696 A | 8/1995 | Ware et al. | 365/222 |
| 5,448,193 A | 9/1995 | Baumert et al. | 327/156 |
| 5,451,898 A | 9/1995 | Johnson | 327/563 |
| 5,457,407 A | 10/1995 | Shu et al. | 326/30 |
| 5,465,076 A | 11/1995 | Yamauchi et al. | 331/179 |
| 5,473,274 A | 12/1995 | Reilly et al. | 327/159 |
| 5,473,575 A | 12/1995 | Farmwald et al. | 365/230.06 |
| 5,473,639 A | 12/1995 | Lee et al. | 375/376 |
| 5,485,490 A | 1/1996 | Leung et al. | 375/371 |
| 5,488,321 A | 1/1996 | Johnson | 327/66 |
| 5,489,864 A | 2/1996 | Ashuri | 327/161 |
| 5,497,127 A | 3/1996 | Sauer | 331/17 |
| 5,498,990 A | 3/1996 | Leung et al. | 327/323 |
| 5,500,808 A | 3/1996 | Wang | 365/189.05 |
| 5,506,814 A | 4/1996 | Hush et al. | 365/230.03 |
| 5,508,638 A | 4/1996 | Cowles et al. | 326/38 |
| 5,513,327 A | 4/1996 | Farmwald et al. | 395/309 |
| 5,532,714 A | 7/1996 | Knapp et al. | 345/114 |
| 5,539,345 A | 7/1996 | Hawkins | 327/150 |
| 5,544,124 A | 8/1996 | Zagar et al. | 365/230.08 |
| 5,544,203 A | 8/1996 | Casasanta et al. | 375/376 |
| 5,552,727 A | 9/1996 | Nakao | 327/159 |
| 5,555,429 A | 9/1996 | Parkinson et al. | 395/800.14 |
| 5,557,224 A | 9/1996 | Wright et al. | 327/156 |
| 5,557,781 A | 9/1996 | Stones et al. | 395/550 |
| 5,563,546 A | 10/1996 | Tsukada | 327/407 |
| 5,568,075 A | 10/1996 | Curran et al. | 327/172 |
| 5,568,077 A | 10/1996 | Sato et al. | 327/199 |
| 5,572,557 A | 11/1996 | Aoki | 375/376 |
| 5,572,722 A | 11/1996 | Vogley | 305/555 |
| 5,574,698 A | 11/1996 | Raad | 365/230.06 |
| 5,576,645 A | 11/1996 | Farwell | 327/94 |
| 5,577,236 A | 11/1996 | Johnson et al. | 395/551 |
| 5,578,940 A | 11/1996 | Dillon et al. | 326/30 |
| 5,578,941 A | 11/1996 | Sher et al. | 326/34 |
| 5,579,326 A | 11/1996 | McClure | 371/61 |
| 5,581,197 A | 12/1996 | Motley et al. | 326/30 |
| 5,589,788 A | 12/1996 | Goto | 327/276 |
| 5,590,073 A | 12/1996 | Arakawa et al. | 365/185.08 |
| 5,594,690 A | 1/1997 | Rothenberger et al. | 365/189.01 |
| 5,614,855 A | 3/1997 | Lee et al. | 327/158 |
| 5,619,473 A | 4/1997 | Hotta | 365/238.5 |
| 5,621,340 A | 4/1997 | Lee et al. | 327/65 |
| 5,621,690 A | 4/1997 | Jungroth et al. | 365/200 |
| 5,621,739 A | 4/1997 | Sine et al. | 371/22.1 |
| 5,627,780 A | 5/1997 | Malhi | 365/185.09 |
| 5,627,791 A | 5/1997 | Wright et al. | 365/222 |
| 5,631,872 A | 5/1997 | Naritake et al. | 365/227 |
| 5,636,163 A | 6/1997 | Furutani et al. | 365/189.01 |
| 5,636,173 A | 6/1997 | Schaefer | 365/230.03 |
| 5,636,174 A | 6/1997 | Rao | 365/230.03 |
| 5,638,335 A | 6/1997 | Akiyama et al. | 365/230.03 |
| 5,646,904 A | 7/1997 | Ohno et al. | 365/233 |
| 5,652,530 A | 7/1997 | Ashuri | 326/93 |
| 5,657,289 A | 8/1997 | Hush et al. | 365/230.05 |
| 5,657,481 A | 8/1997 | Farmwald et al. | 395/551 |
| 5,663,921 A | 9/1997 | Pascucci et al. | 365/233 |
| 5,666,322 A | 9/1997 | Conkle | 365/233 |
| 5,668,763 A | 9/1997 | Fujioka et al. | 365/200 |

| | | | |
|---|---|---|---|
| 5,668,774 A | 9/1997 | Furutani | 365/233 |
| 5,675,274 A | 10/1997 | Kobayashi et al. | 327/158 |
| 5,692,165 A | 11/1997 | Jeddeloh et al. | 395/551 |
| 5,694,065 A | 12/1997 | Hamasaki et al. | 327/108 |
| 5,708,611 A | 1/1998 | Iwamoto | 365/233 X |
| 5,712,580 A | 1/1998 | Baumgartner et al. | 327/12 |
| 5,719,508 A | 2/1998 | Daly | 327/12 |
| 5,740,123 A | 4/1998 | Uchida | 365/233 |
| 5,751,665 A | 5/1998 | Tanoi | 368/120 |
| 5,767,715 A | 6/1998 | Marquis et al. | 365/233 |
| 5,768,177 A | 6/1998 | Sakuragi | 365/194 |
| 5,774,699 A | 6/1998 | Nagae | 395/551 |
| 5,778,214 A | 7/1998 | Taya et al. | 395/551 |
| 5,781,499 A | 7/1998 | Koshikawa | 365/233 |
| 5,784,422 A * | 7/1998 | Heermann | 375/355 |
| 5,789,947 A | 8/1998 | Sato | 327/3 |
| 5,790,612 A | 8/1998 | Chengson et al. | 375/373 |
| 5,794,020 A | 8/1998 | Tanaka et al. | |
| 5,805,931 A | 9/1998 | Morzano et al. | 710/64 |
| 5,812,619 A | 9/1998 | Runaldue | 375/376 |
| 5,822,314 A | 10/1998 | Chater-Lea | 370/337 |
| 5,831,929 A | 11/1998 | Manning | 365/233 |
| 5,841,707 A | 11/1998 | Cline et al. | 365/194 |
| 5,852,378 A | 12/1998 | Keeth | 327/171 |
| 5,872,959 A | 2/1999 | Nguyen | 395/552 |
| 5,889,829 A | 3/1999 | Chiao et al. | 375/376 |
| 5,898,242 A | 4/1999 | Peterson | 327/278 |
| 5,898,674 A | 4/1999 | Mawhinney et al. | 370/247 |
| 5,917,760 A | 6/1999 | Millar | 365/194 |
| 5,920,518 A | 7/1999 | Harrison et al. | 365/233 |
| 5,926,047 A | 7/1999 | Harrison | 327/159 |
| 5,926,436 A | 7/1999 | Toda et al. | 365/236 |
| 5,940,608 A | 8/1999 | Manning | 395/551 |
| 5,940,609 A | 8/1999 | Harrison | 395/559 |
| 5,946,244 A | 8/1999 | Manning | 365/194 |
| 5,953,284 A | 9/1999 | Baker et al. | 365/233 |
| 5,964,884 A | 10/1999 | Partovi et al. | 713/503 |
| 5,990,719 A | 11/1999 | Dai et al. | 327/244 |
| 6,005,823 A | 12/1999 | Martin et al. | 365/230.08 |
| 6,011,732 A | 1/2000 | Harrison et al. | 365/194 |
| 6,016,282 A | 1/2000 | Keeth | 365/233 |
| 6,026,050 A | 2/2000 | Baker et al. | 635/233 |
| 6,029,250 A | 2/2000 | Keeth | 713/400 |
| 6,038,219 A | 3/2000 | Mawhinney et al. | 370/242 |
| 6,067,592 A | 5/2000 | Farmwald et al. | 710/104 |
| 6,101,152 A | 8/2000 | Farmwald et al. | 365/233 |
| 6,101,197 A | 8/2000 | Keeth et al. | 370/517 |
| 6,105,157 A | 8/2000 | Miller | 714/744 |
| 6,147,905 A | 11/2000 | Seino | 365/185.11 |
| 6,147,916 A | 11/2000 | Ogura | 365/203 |
| 6,160,423 A | 12/2000 | Haq | 327/41 |

FOREIGN PATENT DOCUMENTS

| | | |
|---|---|---|
| EP | 0 655 741 A2 | 5/1995 |
| EP | 0 655 834 A1 | 5/1995 |
| EP | 0 680 049 A2 | 11/1995 |
| EP | 0 703 633 A1 | 3/1996 |
| EP | 0 704 848 A3 | 4/1996 |
| EP | 0 704 975 A1 | 4/1996 |
| EP | 0 767 538 A1 | 4/1997 |
| JP | 6-1237512 | 10/1986 |
| JP | 2-112317 | 4/1990 |
| JP | 4-135311 | 5/1992 |
| JP | 5-136664 | 6/1993 |
| JP | 5-282868 | 10/1993 |
| JP | 0-7319577 | 12/1995 |
| WO | WO 94/29871 | 12/1994 |
| WO | WO 95/22200 | 8/1995 |
| WO | WO 95/22206 | 8/1995 |
| WO | WO 96/10866 | 4/1996 |
| WO | WO 97/14289 | 4/1997 |
| WO | WO 97/42557 | 11/1997 |

OTHER PUBLICATIONS

Anonymous, "Programmable Pulse Generator", IBM Technical Disclosure Bulletin, vol. 17, No. 12, May 1975, pp. 3553–3554.

Anonymous, "Pulse Combining Network", IBM Technical Disclosure Bulletin, vol. 32, No. 12, May 1990, pp. 149–151.

Anonymous, "Variable Delay Digital Circuit", IBM Technical Disclosure Bulletin, vol. 35, No. 4A, Sep. 1992, pp. 365–366.

Arai, Y. et al., "A CMOS Four Channel x 1K Time Memory LSI with 1–ns/b Resolution", IEEE Journal of Solid–State Circuits, vol. 27, No. 3, M, 8107 Mar., 1992, No. 3, New York, US, pp. 359–364 and pp. 528–531.

Arai, Y. et al., "A Time Digitizer CMOS Gate–Array with a 250 ps Time Resolution", XP 000597207, IEEE Journal of Solid–State Circuits, vol. 31, No. 2, Feb. 1996, pp. 212–220.

Aviram, A. et al., "Obtaining High Speed Printing on Thermal Sensitive Special Paper with a Resistive Ribbon Print Head", IBM Technical Disclosure Bulletin, vol. 27, No. 5, Oct. 1984, pp. 3059–3060.

Bazes, M., "Two Novel Fully Complementary Self–Biased CMOS Differential Amplifiers", IEEE Journal of Solid–State Circuits, vol. 26, No. 2, Feb. 1991, pp. 165–168.

Chapman, J. et al., "A Low–Cost High–Performance CMOS Timing Vernier for ATE", IEEE International Test Conference, Paper 21.2, 1995, pp. 459–468.

Cho, J. "Digitally–Controlled PLL with Pulse Width Detection Mechanism for Error Correction", ISSCC 1997, Paper No. SA 20.3, pp. 334–335.

Christiansen, J., "An Integrated High Resolution CMOS Timing Generator Based on an Array of Delay Locked Loops", IEEE Journal of Solid–State Circuits, vol. 31, No. 7, Jul. 1996, pp. 952–957.

Combes, M. et al., "A Portable Clock Multiplier Generator Using Digital CMOS Standard Cells", IEEE Journal of Solid–State Circuits, vol. 31, No. 7, Jul. 1996, pp. 958–965.

Descriptive literature entitled, "400MHz SLDRAM, 4M X 16 SLDRAM Pipelined, Eight Bank, 2.5 V Operation," SLDRAM Consortium Advance Sheet, published throughout the United States, pp. 1–22.

Donnelly, K. et al., "A 660 MB/s Interface Megacell Portable Circuit in 0.3 $\mu$m–0.7 $\mu$m CMOS ASIC", IEEE Journal of Solid–State Circuits, vol. 31, No. 12, Dec. 1996, pp. 1995–2001.

"Draft Standard for a High–Speed Memory Interface (SyncLink)", Microprocessor and Microcomputer Standards Subcommittee of the IEEE Computer Society, Copyright 1996 by the Institute of Electrical and Electronics Engineers, Inc., New York, NY, pp. 1–56.

Goto, J. et al., "A PLL–Based Programmable Clock Generator with 50– to 350–MHz Oscillating Range for Video Signal Processors", IEICE Trans. Electron., vol. E77–C, No. 12, Dec. 1994, pp. 1951–1956.

Hamamoto, T., "400–MHz Random Column Operating SDRAM Techniques with Self–Skew Compensation", IEEE Journal of Solid–State Circuits, vol. 33, No. 5, May 1998, pp. 770–778.

Ishibashi, A. et al., "High–Speed Clock Distribution Architecture Employing PLL for 0.6 $\mu$m CMOS SOG", IEEE Custom Integrated Circuits Conference, 1992, pp. 27.6.1–27.6.4.

Kim, B. et al., "A 30MHz High–Speed Analog/Digital PLL in 2μm CMOS", ISSCC, Feb. 1990.

Kikuchi, S. et al., "A Gate–Array–Based 666MHz VLSI Test System", IEEE International Test Conference, Paper 21.1, 1995, pp. 451–458.

Ko, U. et al., "A 30–ps Jitter, 3.6–μs Locking, 3.3–Volt Digital PLL for CMOS Gate Arrays", IEEE Custom Integrated Circuits Conference, 1993, pp. 23.3.1–23.3.4.

Lee, T. et al., "A 2.5V Delay–Locked Loop for an 18Mb 500MB/s DRAM", IEEE International Solid–State Circuits Conference Digest of Technical Papers, Paper No. FA 18.6, 1994, pp. 300–301.

Lesmeister, G., "A Densely Integrated High Performance CMOS Tester", International Test Conference, Paper 16.2, 1991, pp. 426–429.

Ljuslin, C. et al., "An Integrated 16–channel CMOS Time to Digital Converter", IEEE Nuclear Science Symposium & Medical Imaging Conference Record, vol. 1, 1993, pp. 625–629.

Maneatis, J., "Low–Jitter Process–Independent DLL and PLL Based on Self–Biased Techniques", IEEE Journal of Solid–State Circuits, vol. 31, No. 11, Nov. 1996, pp. 1723–1732.

Nakamura, M. et al., "A 156 Mbps CMOS Clock Recovery Circuit for Burst–mode Transmission", Symposium on VLSI Circuits Digest of Technical Papers, 1996, pp. 122–123.

Nielson, E., "Inverting latches make simple VCO", EDN, Jun. 19, 1997.

Novof, I. et al., "Fully Integrated CMOS Phase–Locked Loop with 15 to 240 MHz Locking Range and ±50 ps Jitter", IEEE Journal of Solid–State Circuits, vol. 30, No. 11, Nov. 1995, pp. 1259–1266.

Santos, D. et al., "A CMOS Delay Locked Loop And Sub–Nanosecond Time–to–Digital Converter Chip", IEEE Nuclear Science Symposium and Medical Imaging Conference Record, vol. 1, Oct. 1995, pp. 289–291.

Saeki, T. et al., "A 2.5–ns Clock Access, 250–MHz, 256–Mb SDRAM with Synchronous Mirror Delay", IEEE Journal of Solid–State Circuits, vol. 31, No. 11, Nov. 1996, pp. 1656–1665.

Shirotori, T. et al., "PLL–based, Impedance Controlled Output Buffer", 1991 Symposium on VLSI Circuits Digest of Technical Papers, pp. 49–50.

Sidiropoulos, S. et al., "A 700–Mb/s/pin CMOS Signaling Interface Using Current Integrating Receivers", IEEE Journal of Solid–State Circuits, vol. 32, No. 5, May 1997, pp. 681–690.

Sidiropoulos, S. et al., "A CMOS 500 Mbps/pin synchronous point to point link interface", IEEE Symposium on VLSI Circuits Digest of Technical Papers, 1994, pp. 43–44.

Sidiropoulos, S. et al., "A Semi–Digital DLL with Unlimited Phase Shift Capability and 0.08–400MHz Operating Range," IEEE International Solid State Circuits Conference, Feb. 8, 1997, pp. 332–333.

Soyuer, M. et al., "A Fully Monolithic 1.25GHz CMOS Frequency Synthesizer", IEEE Symposium on VLSI Circuits Digest of Technical Papers, 1994, pp. 127–128.

Taguchi, M. et al., "A 40–ns 64–Mb DRAM with 64–b Parallel Data Bus Architecture", IEEE Journal of Solid–State Circuits, vol. 26, No. 11, Nov. 1991, pp. 1493–1497.

Tanoi, S. et al., "A 250–622 MHz Deskew and Jitter–Suppressed Clock Buffer Using a Frequency– and Delay–Locked Two–Loop Architecture", 1995 Symposium on VLSI Circuits Digest of Technical Papers, vol. 11, No. 2, pp. 85–86.

Tanoi, S. et. al., "A 250–622 MHz Deskew and Jitter–Suppressed Clock Buffer Using Two–Loop Architecture", IEEE IEICE Trans. Electron., vol. E–79–C. No. 7, Jul. 1996, pp. 898–904.

von Kaenel, V. et al., "A 320 MHz, 1.5 mW @ 1.35 V CMOS PLL for Microprocessor Clock Generation", IEEE Journal of Solid–State Circuits, vol. 31, No. 11, Nov. 1996, pp. 1715–1722.

Watson, R. et al., "Clock Buffer Chip with Absolute Delay Regulation Over Process and Environmental Variations", IEEE Custom Integrated Circuits Conference, 1992, pp. 25.2.1–25.2.5.

Yoshimura, T. et al. "A 622–Mb/s Bit/Frame Synchronizer for High–Speed Backplane Data Communication", IEEE Journal of Solid–State Circuits, vol. 31, No. 7, Jul. 1996, pp. 1063–1066.

* cited by examiner

METHOD AND APPARATUS FOR BIT-TO-BIT TIMING CORRECTION OF A HIGH SPEED MEMORY BUS

TECHNICAL FIELD

The present invention relates generally to integrated circuit devices, and more particularly to a circuit and process of adjusting the phases of a plurality of internal clock signals and utilizing such internal clock signals to capture respective digital signals contained in packet words applied to a packetized memory device.

BACKGROUND OF THE INVENTION

Conventional computer systems include a processor (not shown) coupled to a variety of memory devices, including read-only memories ("ROMs") which traditionally store instructions for the processor, and a system memory to which the processor may write data and from which the processor may read data. The processor may also communicate with an external cache memory, which is generally a static random access memory ("SRAM"). The processor also communicates with input devices, output devices, and data storage devices.

Processors generally operate at a relatively high speed. Processors such as the Pentium® and Pentium II® microprocessors are currently available that operate at clock speeds of at least 400 MHz. However, the remaining components of existing computer systems, with the exception of SRAM cache, are not capable of operating at the speed of the processor. For this reason, the system memory devices, as well as the input devices, output devices, and data storage devices, are not coupled directly to the processor bus. Instead, the system memory devices are generally coupled to the processor bus through a memory controller, bus bridge or similar device, and the input devices, output devices, and data storage devices are coupled to the processor bus through a bus bridge. The memory controller allows the system memory devices to operate at a lower clock frequency that is substantially lower than the clock frequency of the processor. Similarly, the bus bridge allows the input devices, output devices, and data storage devices to operate at a substantially lower frequency. Currently, for example, a processor having a 300 MHz clock frequency may be mounted on a mother board having a 66 MHz clock frequency for controlling the system memory devices and other components.

Access to system memory is a frequent operation for the processor. The time required for the processor, operating, for example, at 300 MHz, to read data from or write data to a system memory device operating at, for example, 66 MHz, greatly slows the rate at which the processor is able to accomplish its operations. Thus, much effort has been devoted to increasing the operating speed of system memory devices.

System memory devices are generally dynamic random access memories ("DRAMs"). Initially, DRAMs were asynchronous and thus did not operate at even the clock speed of the motherboard. In fact, access to asynchronous DRAMs often required that wait states be generated to halt the processor until the DRAM had completed a memory transfer. However, the operating speed of asynchronous DRAMs was successfully increased through such innovations as burst and page mode DRAMs which did not require that an address be provided to the DRAM for each memory access. More recently, synchronous dynamic random access memories ("SDRAMs") have been developed to allow the pipelined transfer of data at the clock speed of the motherboard. However, even SDRAMs are incapable of operating at the clock speed of currently available processors. Thus, SDRAMs cannot be connected directly to the processor bus, but instead must interface with the processor bus through a memory controller, bus bridge, or similar device. The disparity between the operating speed of the processor and the operating speed of SDRAMs continues to limit the speed at which processors may complete operations requiring access to system memory.

A solution to this operating speed disparity has been proposed in the form of a computer architecture known as a synchronous link architecture. In the synchronous link architecture, the system memory may be coupled to the processor either directly through the processor bus or through a memory controller. Rather than requiring that separate address and control signals be provided to the system memory, synchronous link memory devices receive command packets that include both control and address information. The synchronous link memory device then outputs or receives data on a data bus that may be coupled directly to the data bus portion of the processor bus.

An example of a computer system 10 using the synchronous link architecture is shown in FIG. 1. The computer system 10 includes a processor 12 having a processor bus 14 coupled through a memory controller 18 and system memory bus 23 to three packetized or synchronous link dynamic random access memory ("SLDRAM") devices 16*a–c*. The computer system 10 also includes one or more input devices 20, such as a keypad or a mouse, coupled to the processor 12 through a bus bridge 22 and an expansion bus 24, such as an industry standard architecture ("ISA") bus or a peripheral component interconnect ("PCI") bus. The input devices 20 allow an operator or an electronic device to input data to the computer system 10. One or more output devices 30 are coupled to the processor 12 to display or otherwise output data generated by the processor 12. The output devices 30 are coupled to the processor 12 through the expansion bus 24, bus bridge 22 and processor bus 14. Examples of output devices 24 include printers and a video display units. One or more data storage devices 38 are coupled to the processor 12 through the processor bus 14, bus bridge 22, and expansion bus 24 to store data in or retrieve data from storage media (not shown). Examples of storage devices 38 and storage media include fixed disk drives floppy disk drives, tape cassettes and compact-disk read-only memory drives.

In operation, the processor 12 sends a data transfer command via the processor bus 14 to the memory controller 18, which, in turn, communicates with the memory devices 16*a–c* via the system memory bus 23 by sending the memory devices 16*a–c* command packets that contain both control and address information. Data is coupled between the memory controller 18 and the memory devices 16*a–c* through a data bus portion of the system memory bus 23. During a read operation, data is transferred from the packetized memory devices 16*a–c* over the memory bus 23 to the memory controller 18 which, in turn, transfers the data over the processor bus 14 to the processor 12. The processor 12 transfers write data over the processor bus 14 to the memory controller 18 which, in turn, transfers the write data over the system memory bus 23 to the packetized memory devices 16*a–c*. Although all the memory devices 16*a–c* are coupled to the same conductors of the system memory bus 23, only one memory device 16*a–c* at a time reads or writes data, thus avoiding bus contention on the memory bus 23. Bus contention is avoided by each of the memory devices 16*a–c* on the system memory 22 having a unique identifier, and the command packet contains an identifying code that selects only one of these components.

The computer system 10 also includes a number of other components and signal lines that have been omitted from FIG. 1 in the interests of brevity. For example, the memory devices 16a–c also receive a command clock signal to provide internal timing signals, and receive and provide respective data clock signals for clocking data into and out of the memory device, and also receive a FLAG signal signifying the start of a command packet, as will be explained in more detail below.

A typical command packet CA<0:39> for a packetized memory device is shown in FIG. 2 and is formed by 4 command packet words CA<0:9>, each of which contains 10 bits of data. As will be explained in more detail below, each packet word CA<0:9> is applied on a command bus CA including 10 lines CA0–CA9. In FIG. 2, the four packet words CA<0:9> comprising a command packet CA<0:39> are designated PW1–PW4. The first packet word $PW_1$ contains 7 bits of data identifying the packetized memory device 16a–c that is the intended recipient of the command packet. As explained below, each of the packetized memory devices 16a–c is provided with a unique ID code that is compared to the 7 ID bits in the first packet word $PW_1$. Thus, although all of the packetized memory devices 16a–c will receive the command packet CA<0:39>, only the packetized memory device having an ID code that matches the 7 ID bits of the first packet word $PW_1$ will respond to the packet.

The remaining 3 bits of the first packet word $PW_1$ as well as 3 bits of the second packet word $PW_2$ comprise a 6 bit command. Typical commands are read and write in a variety of modes, such as accesses to pages or banks of memory cells. The remaining 7 bits of the second packet word $PW_2$ and portions of the third and fourth packet words $PW_3$ and $PW_4$ comprise a 20 bit address specifying a bank, row and column address for a memory transfer or the start of a multiple bit memory transfer. In one embodiment, the 20-bit address is divided into 3 bits of bank address, 10 bits of row address, and 7 bits of column address. Although the command packet shown in FIG. 2 is composed of 4 packet words PW1–PW4 each containing up to 10 bits, it will be understood that a command packet may contain a lesser or greater number of packet words, and each packet word may contain a lesser or greater number of bits.

The memory device 16a is shown in block diagram form in FIG. 3. Each of the memory devices 16a–c includes a clock generator circuit 40 that receives a command clock signal CCLK and generates a large number of other clock and timing signals to control the timing of various operations in the memory device 16a. The memory device 16a also includes a command buffer 46 and an address capture circuit 48 which receive an internal clock signal ICLK, a command packet word CA<0:9> on a 10 bit command bus CA, and a terminal 52 receiving a FLAG signal. The clock generator 40 generates the ICLK signal in response to the CCLK signal, and the ICLK signal has a phase shift relative to the CCLK signal. A memory controller (not shown) or other device normally transmits command packet words CA<0:9> to the memory device 16a coincident with the command clock signal CCLK. As explained above, the command packet CA<0:39>, which generally includes four 10-bit packet words PW1–PW4, contains control and address information for each memory transfer. The FLAG signal is transmitted coincident with each packet work CA<0:9> and identifies the start of a command packet CA<0:39>. The FLAG signal also signals the start of an initialization mode of operation, as will be described in more detail below.

The command buffer 46 latches the command packet CA<0:39> from the command bus CA responsive to the ICLK signal, and compares at least a portion of the command packet to identifying data from an ID register 56 to determine if the packet is directed to the memory device 16a or some other memory device 16b, c. If the command buffer 46 determines that the command packet is directed to the memory device 16a, it then provides the command portion of the packet to a command decoder and sequencer 60. The command decoder and sequencer 60 generates a large number of internal control signals to control the operation of the memory device 16a during a memory transfer.

The address capture circuit 48 also receives the command packet CA<0:39> from the command bus CA and outputs a 20-bit address corresponding to the address portion in the command packet. The address is provided to an address sequencer 64, which generates a corresponding 3-bit bank address on bus 66, a 10-bit row address on bus 68, and a 7-bit column address on bus 70. The row and column addresses are processed by row and column address paths, as will be described in more detail below.

One of the problems of conventional DRAMs is their relatively low speed resulting from the time required to precharge and equilibrate circuitry in the DRAM array. The packetized memory device 16a shown in FIG. 3 largely avoids this problem by using a plurality of memory banks 80, in this case eight memory banks 80a–h. After a read from one bank 80a, the bank 80a can be precharged while the remaining banks 80b–h are being accessed. Each of the memory banks 80a–h receives a row address from a respective row latch/decoder/driver 82a–h. All of the row latch/decoder/drivers 82a–h receive the same row address from a predecoder 84 which, in turn, receives a row address from either a row address register 86 or a refresh counter 88 as determined by a multiplexer 90. However, only one of the row latch/decoder/drivers 82a–h is active at any one time as determined by bank control logic 94 as a function of a bank address from a bank address register 96.

The column address on bus 70 is applied to a column latch/decoder 100, which supplies I/O gating signals to an I/O gating circuit 102. The I/O gating circuit 102 interfaces with columns of the memory banks 80a–h through sense amplifiers 104. Data is coupled to or from the memory banks 80a–h through the sense amps 104 and I/O gating circuit 102 to a data path subsystem 108 which includes a read data path 110 and a write data path 112. The read data path 110 includes a read latch 120 that stores data from the I/O gating circuit 102.

In the memory device 16a shown in FIG. 3, 64 bits of data are stored in the read latch 120. The read latch then provides four 16-bit data words to an output multiplexer 122 that sequentially supplies each of the 16-bit data words to a read FIFO buffer 124. Successive 16-bit data words are clocked into the read FIFO buffer 124 by a clock signal RCLK generated from the internal clock signal ICLK. The 16-bit data words are then clocked out of the read FIFO buffer 124 by a clock signal obtained by coupling the RCLK signal through a programmable delay circuit 126. The programmable delay circuit 126 is programmed during initialization of the memory device 16a so that the data from the memory device is received by a memory controller, processor, or other device (not shown in FIG. 3) at the proper time. The FIFO buffer 124 sequentially applies the 16-bit data words to a driver circuit 128 which, in turn, applies the 16-bit data words to a data bus DQ forming part of the processor bus 14 (see FIG. 1). The driver circuit 128 also applies one of two data clock signals DCLK0 and DCLK1 to respective data clock lines 132 and 133. The data clocks DCLK0 and DCLK1 enable a device, such as the processor 12, reading the data on the data bus DQ to be synchronized with the data. Particular bits in the command portion of the command packet CA0–CA9 determine which of the two data clocks DCLK0 and DCLK1 is applied by the driver circuit 128. It should be noted that the clock signals CCLK, DCLK0, and DCLK1 are differential clock signals that each include true and complementary signals, but for ease of explanation only one signal for each clock is illustrated and described.

The write data path 112 includes a receiver buffer 140 coupled to the data bus 130. The receiver buffer 140 sequentially applies 16-bit data words from the data bus DQ to four input registers 142, each of which is selectively enabled by a signal from a clock generator circuit 144. The clock generator circuit 144 generates these enable signals responsive to the selected one of the data clock signals DCLK0 and DCLK1. The memory controller or processor determines which data clock DCLK0 or DCLK1 will be utilized during a write operation using the command portion of a command packet CA<0:39> applied to the memory device 16a. As with the command clock signal CCLK and command packet, the memory controller or other device (not shown) normally transmits the data to the memory device 16a coincident with the selected one of the data clock signals DCLK0 and DCLK1. The clock generator 144 is programmed during initialization to adjust the timing of the clock signal applied to the input registers 142 relative to the selected one of the data clock signals DCLK0 and DCLK1 so that the input registers 142 can capture the write data at the proper times. In response to the clock signal generated responsive to the selected data clock DCLK0 or DCLK1, the input registers 142 sequentially store four 16-bit data words and combine them into one 64-bit data word applied to a write FIFO buffer 148. The write FIFO buffer 148 is clocked by a signal from the clock generator 144 and an internal write clock WCLK to sequentially apply 64-bit write data to a write latch and driver 150. The write latch and driver 150 applies the 64-bit write data to one of the memory banks 80a–h through the I/O gating circuit 102 and the sense amplifiers 104.

As mentioned above, an important goal of the synchronous link architecture is to allow data transfer between a processor and a memory device to occur at a significantly faster rate. It should be noted that the phrase "data transfer" as used herein includes all digital signals transferred to and from the memory device 16a, and thus includes signals on the CA and DQ busses as well as the FLAG signal. As the data transfer rate increases, it becomes more difficult to maintain the required timing between signals transmitted to the memory device 16a. For example, as mentioned above, the command packet CA<0:39> is normally transmitted to the memory device 16a coincident with the command clock signal CCLK, and the data is normally transmitted to the memory device 16a coincident with the selected one of the data clock signals DCLK0 and DCLK1. However, because of unequal signal delays and other factors, the command packet words CA<0:9> may not arrive at the memory device 16a coincident with the command clock signal CCLK, and the data packet words may not arrive at the memory device 16a coincident with the selected data clock signal DCLK0 or DCLK1. Moreover, even if these signals are actually coupled to the memory device 16a coincident with each other, this timing may be lost once they are coupled to circuits within the memory device. For example, internal signals require time to propagate to various circuitry in the memory device 16a, differences in the lengths of signal routes can cause differences in the times at which signals reach the circuitry, and differences in capacitive loading of signal lines can also cause differences in the times at which signals reach the circuitry. These differences in arrival times can become significant at high data transfer rates and eventually limit the operating speed of the packetized memory devices.

The problems associated with varying arrival times are exacerbated as timing tolerances become more restricted at higher data transfer rates. For example, if the internal clock ICLK derived from the command clock CCLK does not cause each of the packet words CA<0:9> comprising a command packet CA<0:39> to latch at the proper time, errors in the operation of the memory device may result. Thus, the timing or phase shift of the internal clock signal ICLK relative to the command clock signal CCLK must be adjusted such that the ICLK signal may be utilized to successfully latch each of the respective command signals CA<0>–CA<9> comprising a packet word CA<0:9>. This is true notwithstanding the varying arrival times of the respective command signals CA<0>–CA<9> within each packet word CA<0:9> relative to the ICLK signal.

Thus, for each of the clock signals CCLK, DCLK0, and DCLK1 the phase shift of respective internal clock signals derived from these respective external clock signals must be adjusted so the internal clock signals can be used to latch corresponding packet words at optimum times. For example, the phase shift of the internal clock signal ICLK relative to the command clock signal CCLK must be adjusted so that all command signals CA<0>–CA<9> in each packet word CA<0:9> are latched at the optimum time.

As the data transfer rate increases, the duration for which each signal CA<0>–CA<9> in a packet word CA<0:9> is valid decreases by a corresponding amount, as will be understood by one skilled in the art. More specifically, the data window or "eye" for each of the CA<0>–CA<9> signals decreases at higher data transfer rates. As understood by one skilled in the art, the data eye for each of the CA<0>–CA<9> signals defines the actual duration that each signal is valid after timing skew of the signal is considered. The timing skew of the CA<0>–CA<9> signals arises from a variety of timing errors such as loading on the lines of the CA bus and the physical lengths of such lines. FIG. 4 is a timing diagram illustrating the data eyes for a number of the CA<0>–CA<9> signals. The solid lines indicate the ideal CA<0>, CA<1>, and CA<9> signals, and the dashed lines indicate the worst case potential time skew for each of these signals. The data eyes DE of the CA<0>, CA<1>, and CA<9> signals are defined by time intervals $t_0-t_3$, $t_1-t_4$, and $t_5-t_7$, respectively.

As data eyes of the applied signals CA<0>–CA<9> decrease at high data transfer rates, it is possible that one or more of these signals in each packet word CA<0:9> will have arrival times such that not all signals in a packet word are simultaneously valid at the memory device 16a, and thus cannot be successfully captured by the internal clock signal ICLK. For example, in FIG. 4, the data eye DE of the CA<0> signal from times $t_0-t_3$ does not overlap the data eye of the CA<9> signal from times $t_5-t_7$. In this situation, the signals CA<0> and CA<9> are not both valid at the memory device 16a at the same time so the packet word CA<0:9> cannot be successfully captured responsive to the ICLK signal. The transition of the ICLK signal at time $t_2$ could successfully capture the CA<0> and CA<1> signals but not the CA<9> signal, and, conversely, the transition of the ICLK signal at time $t_6$ could successfully capture the CA<9> signal but not the CA<0> and CA<1> signals, which have already gone invalid.

There is a need for successfully capturing each of the signals in packets of signals applied to a packetized memory device at very high data transfer rates. Moreover, although the foregoing discussion is directed to packetized memory devices like SLDRAMs, similar problems exist in other types of integrated circuits as well, including other types of memory devices.

SUMMARY OF THE INVENTION

According to one aspect of the present invention, a bus capture circuit captures digital signals applied on respective lines of a bus. In one embodiment, the bus capture circuit includes a plurality of latches, each latch having an input terminal coupled to a respective bus line, an output terminal, and a clock terminal. Each latch operates to latch a digital signal applied at its input terminal responsive to a clock signal applied to its clock terminal. A clock generator operates to generate a plurality of internal clock signals, each internal clock signal being applied to the clock terminal of a respective latch. Each clock signal has a respective phase that is determined independently of the phases of the other clock signals as a function of the digital signal applied to the latch.

According to another aspect of the present invention, digital signal packets applied to a packetized memory device are captured. Each of the digital signal packets includes a plurality of digital signals that are applied to respective latches in the packetized memory device. The packetized memory device is placed in a synchronization mode of operation, and a plurality of internal clock signals are generated responsive to an external clock signal. Each internal clock signal is applied to an associated latch and has a phase relative to the digital signal applied to the associated latch. Each of the digital signals is stored in the corresponding latch responsive to the associated internal clock signal. The respective phase shifts of the internal clock signals are adjusted to successfully capture each of the digital signals in the corresponding latch. Each of the digital signals in the applied digital signal packets may be an applied 15-bit repeating pseudo-random bit sequence, such as the sequence "111101011001000."

According to a further aspect of the present invention, a synchronization circuit captures digital signal packets applied to a packetized memory device. Each digital signal packet includes a plurality of digital signals applied to respective latches in the packetized memory device. A clock generator circuit generates a plurality of internal clock signals on respective outputs responsive to an external clock signal. Each internal clock signal has a corresponding phase relative to the external clock signal. A plurality of selection circuits each include inputs coupled to respective outputs of the clock generator circuit and have an output coupled to a clock terminal of an associated latch. Each selection circuit couples a selected input to its output responsive to a corresponding phase command signal. An evaluation circuit is coupled to receive a plurality of digital signals sequentially stored in a selected one of the latches, and generates a results signal indicating whether each of the digital signals has an expected value.

A control circuit is coupled to the evaluation circuit and the selection circuits, and sequentially selects the latches. The control circuit operates for each selected latch to adjust the phase command signals applied to the selection circuit coupled to the selected latch, and store the corresponding results signals sequentially received from the evaluation circuit. The control circuit generates a final phase command signal from the stored results signals, and applies each final phase command signal to the corresponding selection circuit. In this way, respective digital signals in subsequently applied digital signal packets are captured responsive to the respective internal clock signals having phases corresponding to the respective final phase command signals.

DETAILED DESCRIPTION OF THE INVENTION

Figure 3:
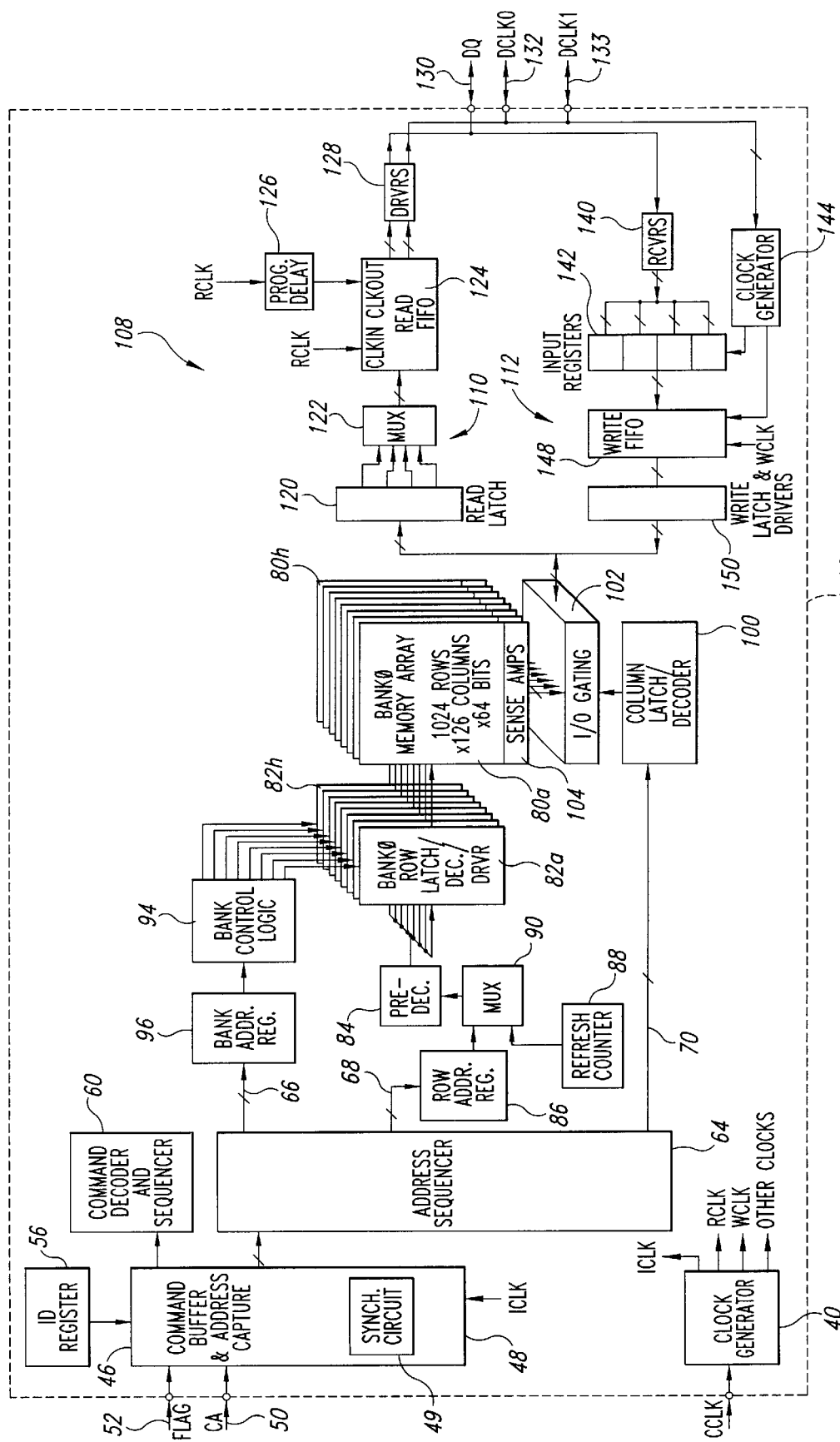
FIG. 3 is a block diagram of a conventional packetized memory device in the computer system of FIG. 1.
Figure 4:
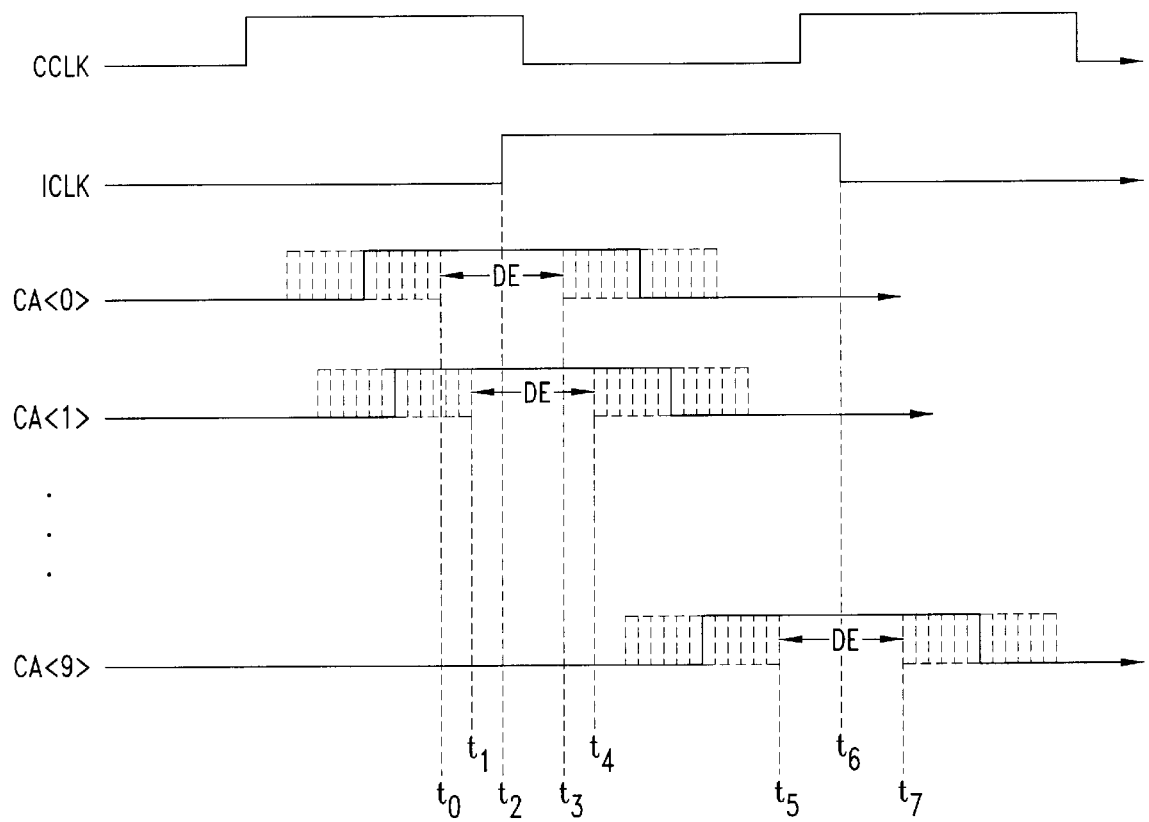
FIG. 4 is a timing diagram illustrating the effect of timing skews of the respective command signals at high data transfer rates.
Figure 5:
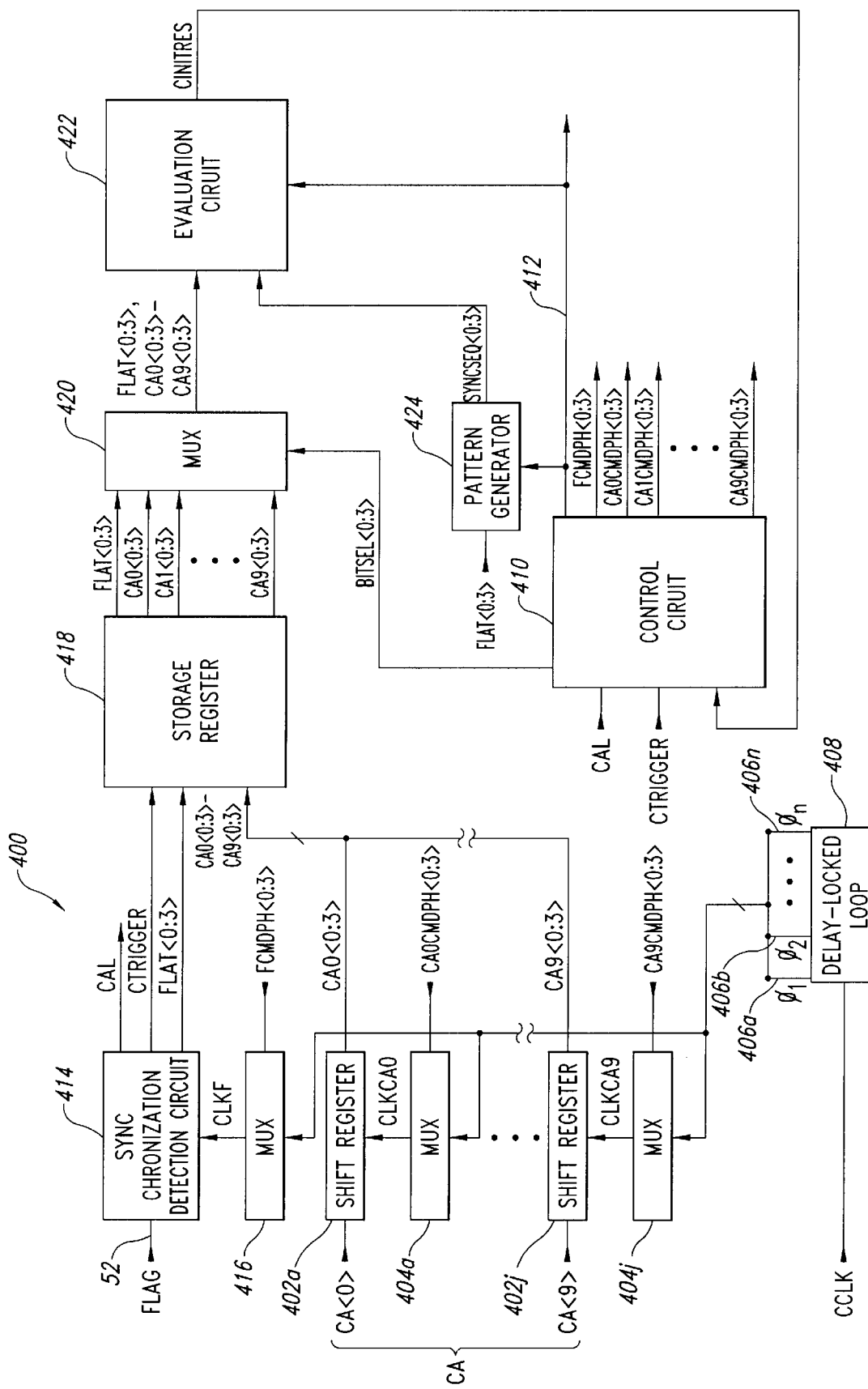
FIG. 5 is block diagram of a bit-to-bit synchronization circuit for a packetized memory device according to one embodiment of the present invention.

FIG. 5 is a functional block diagram of a bit-to-bit synchronization circuit 400 according to one embodiment of the present invention. The bit-to-bit synchronization circuit 400 is typically contained in the command buffer 46 and address capture circuit 48 in the packetized memory device 16a of FIG. 3, and operates during an initialization mode of operation to independently adjust the phase shifts of a plurality of internal clock signals CLKF and CLKCA0–CLKCA9 such that these internal signals may be utilized to capture the FLAG signal and CA<0>–CA<9> signals applied to the packetized memory device 16a, as will be explained in more detail below. This process may be alternately referred to as bit-to-bit phase adjustment hereinafter since the respective phases of internal clock signals CLKF and CLKCA0–CLKCA9 are adjusted and utilized to capture the respective FLAG and CA<0>–CA<9> signals. Although the bit-to-bit synchronization circuit 400 is shown for only the FLAG and CA<0>–CA<9> signals, one skilled in the art will realize that the synchronization circuit 400 may also adjust the phases of a plurality of internal clock signals utilized to capture respective data signals applied on the data bus DQ in the same way.

The bit-to-bit synchronization circuit 400 includes a plurality of shift registers 402a–j receiving respective command signals CA<0>–CA<9> applied on the command bus CA. In the embodiment of FIG. 5 the synchronization circuit 400 includes the ten shift registers 402a–402j, but one skilled in the art will realize the number of shift registers may vary and corresponds to the width of the command bus CA. Each of the shift registers 402a–402j includes a plurality of stages where the number of stages corresponds to the number of command packet words CA<0:9> in the applied command packets CA<0:39>. Thus, in the embodiment of FIG. 5, each of the shift registers 402a–402j includes four stages, one for each packet word CA<0:9> contained in an applied command packet CA<0:39>. A plurality of multiplexers 404a–404j apply respective clock signals CLKCA0–CLKCA9 to clock the shift registers 402a–402j, respectively. Each of the shift registers 402a–402j sequentially shifts the corresponding command signal CA<0>–CA<9> into its first stage, and then through subsequent stages responsive to each transition of the corresponding clock signal CLKCA0–CLKCA9, and outputs a 4-bit command word CA0<0:3>–CA9<0:3>corresponding to the four command signals CA<0>–CA<9> sequentially received and shifted into the shift register. For example, the shift register 402a shifts the sequentially received command signal CA<0> through its respective stages responsive to each transition of the CLKCA0 signal, and outputs the sequentially latched values of the command signal CA<0> collectively as the 4-bit command word CA0<0:3>.

A delay-locked loop circuit 408 generates a plurality of clock signals 406a–n responsive to the CCLK signal, and applies these clock signals 406a–n to each of the multiplexers 404a–j. The clock signals 406a–406n have phase shifts, designated $\phi_1$–$\phi_n$, respectively, relative to the CCLK signal. In the embodiment of FIG. 5, the delay locked loop circuit 408 develops 16 clock signals 406a–406n, and maintains a phase shift of 180° between the clock signals 406a and 406n. Thus, in this embodiment, the phases of the clock signals 406a–406n increase in increments of 11.25 degrees from the phase $\phi_1$ to $\phi_n$. In other words, the clock signal 406a has a phase $\phi_1$ relative to the CCLK signal, and each of the clock signals 406b–406n has a phase 11.25 degrees greater than the preceding phase such that the clock signal 406n has the phase $\phi_1$ that is 180° greater than the phase $\phi_1$. As will be understood by one skilled in the art, the delay-locked loop circuit 408 may develop a greater or lesser number of clock signals 406, and these clock signals may have different phases relative to each other and to the CCLK signal. A more detailed description of one embodiment of the delay-locked loop circuit 408 is described in U.S. patent application Ser. No. 08/890,055 to Baker et al. entitled METHOD AND APPARATUS FOR ADAPTIVELY ADJUSTING THE TIMING OF A CLOCK SIGNAL USED TO LATCH DIGITAL SIGNALS, AND MEMORY DEVICE USING SAME, which is incorporated herein by reference.

The multiplexers 404a–404j each receive the clock signals 406a–406n from the delay-locked loop circuit 408, and each of the multiplexers 404a–404j further receives a corresponding phase command word CA0CMDPH<0:3>–CA9CMDPH<0:3> from a control circuit 410. in response to the corresponding phase command word CA0CMDPH<0:3>–CA9CMDPH<0:3>, each of the multiplexers 404a–j outputs one of the clock signals 406a–n to clock the associated shift register 402a–j. For example, the multiplexer 404a outputs one of the clock signals 406a–406n as the clock signal CLKCA0 responsive to the phase command word CA0CMDPH<0:3>. Thus, the value of the phase command word CA0CMDPH<0:3> determines the phase of the clock signal CLKCA0 relative to the command clock signal CCLK. In this way, the phase shift of each of the clock signals CLKCA0–CLKCA9 relative to the command clock signal CCLK is independently determined responsive to the respective phase command words CA0CMDPH<0:3>–CA9CMDPH<0:3>. The control circuit 410 generates the phase command words CA0CMDPH<0:3>–CA9CMDPH<0:3> and a plurality of control signals 412 to control operation of components within the synchronization circuit 400 during the synchronization mode of operation, as will be explained in more detail below.

The synchronization circuit 400 further includes a synchronization detection circuit 414 including a shift register (not shown in FIG. 5) that shifts sequentially received FLAG signals into respective stages in response to a clock signal CLKF output from a multiplexer 416. The multiplexer 416 operates in the same way as the previously described multiplexers 404a–404j to output one of the clock signals 406a–406n from the delay locked loop circuit 408 as the clock signal CLKF responsive to a phase command word FCMDPH<0:3> from the control circuit 410. Thus, by controlling the value of the phase command word FCMDPH<0:3>, the control circuit 410 adjusts the phase of the CLKF signal relative to the command clock signal CCLK just as for each of the clock signals CLKCA0–CLKCA9 utilized in latching respective command signals CA<0>–CA<9>. In the embodiment of FIG. 5, the synchronization detection circuit 414 includes a four stage shift register that shifts sequentially received FLAG signals through its respective stages and outputs the latched FLAG signals as a four bit flag-latched word FLAT<0:3>.

The synchronization detection circuit 414 also detects the synchronization mode of operation and activates a calibration signal CAL when this mode is detected. As previously described, during normal operation, the FLAG signal is a binary 1 to signal the start of a command packet CA<0:39>. Thus, during normal operation, the FLAG bit applied coincident with the first packet word CA<0:9> is a binary 1, and the FLAG bits applied coincident with the second, third and fourth packet words CA<0:9> of the command packet CA<0:39> are binary 0's. The synchronization mode of operation is signaled by two consecutive binary 1's for the FLAG signal. When the synchronization detection circuit 414 detects two consecutive binary 1's for the FLAG signal, indicating the synchronization mode of operation, the circuit activates the CAL signal signaling the start of the synchronization mode of operation.

The synchronization detection circuit 414 also generates a command trigger pulse signal CTRIGGER after each command packet CA<0:39> has been latched by the shift registers 402a–402j. Recall, each command packet CA<0:39> includes four packet words CA<0:9>, and four FLAG signals are applied coincident with each of these packet words. Thus, the synchronization detection circuit 414 generates the CTRIGGER pulse after four FLAG signals, one applied coincident with each packet word CA<0:9> of an applied command packet CA<0:39>, have been shifted into the circuit 414. A more detailed description of one embodiment of the synchronization detection circuit 414 is described in U.S. patent application Ser. No. 09/146,716 to Manning entitled METHOD AND APPARATUS FOR RESYNCHRONIZING A PLURALITY OF CLOCK SIGNALS USED IN LATCHING RESPECTIVE DIGITAL SIGNALS APPLIED TO A PACKETIZED MEMORY DEVICE, which is incorporated herein by reference.

A storage register 418 receives the flag-latched word FLAT<0:3> from the synchronization detection circuit 414 and the command bit words CA0<0:3>–CA9<0:3> from the respective shift registers 402a–402j, and latches the received FLAT<0:3> and CA0<0:3>–CA9<0:3> words responsive to the CTRIGGER signal from the synchronization detection circuit 414. In this way, the storage register 418 latches the FLAT<0:3> and CA0<0:3>–CA9<0:3> words after each command packet CA<0:39> has been shifted into the registers 402a–402j. One skilled in the art will realize the storage register 418, shift registers 40a–j, and the shift register in the synchronization detection circuit 414 must be capable of latching data signals at very fast rates during operation of the synchronization circuit 400, and during normal operation of the memory device 16a containing the circuit 400. For example, if the CCLK signal has a frequency of 400 MHz, each of the shift registers 402a–j must latch the corresponding command signal CA<0>–CA<9> every 1250 picoseconds (ps) (i.e., one command signal in response to each falling and rising edge of the CCLK signal). One embodiment of the shift registers 402a–j and storage register 418 that may be utilized in the synchronization circuit 420 is described in more detail in U.S. patent application Ser. No. 08/994,461 to Manning entitled METHOD AND SYSTEM FOR PROCESSING PIPELINED MEMORY COMMANDS, which is incorporated herein by reference.

The storage register 418 outputs the latched FLAT<0:3> and CA0<0:3>–CA9<0:3> words to a multiplexer 420 which, in turn, applies a selected one of these words to an evaluation circuit 422 in response to a bit select word BITSEL<0:3> generated by the control circuit 410. The control circuit 410 adjusts the value of the BITSEL<0:3> word to select which one of the FLAT<0:3>, CA0<0:3>–CA9<0:3> words is applied to the evaluation circuit 422, which compares the selected word from the multiplexer 420 to an expected data or synchronization sequence word SYNCSEQ<0:3> generated by a pattern generator 424, and develops a command initialization results signal CINITRES in response to this comparison. The pattern generator 424 receives the FLAT<0:3> word from the synchronization detection circuit 414 and sequentially generates SYNCSEQ<0:3> words in response to this word, as will be described in more detail below. The SYNCSEQ<0:3> word generated by the pattern generator 424 corresponds to the expected values for the bits in the applied FLAT<0:3> or CA0<0:3>–CA9<0:3> word. When the bits of the applied word FLAT<0:3>–CA<0:3> have their expected values determined by the SYNCSEQ<0:3> word, the evaluation circuit 422 drives the CINITRES signal high, indicating the corresponding one of the CA<0>–CA<9> or FLAG signals was successfully captured. For example, when the BITSEL<0:3> word selects the CA0<0:3> word and each bit of this word has its expected value determined by the SYNCSEQ<0:3> word, the evaluation circuit 422 drives the CINITRES signal high indicating the CA0 signal was successfully captured. In contrast, when at least one of the bits in the applied CA0<0:3> word does not have its expected value, the evaluation circuit 422 drives the CINITRES signal low, indicating the CA<0> signal was unsuccessfully captured.

Figure 1:
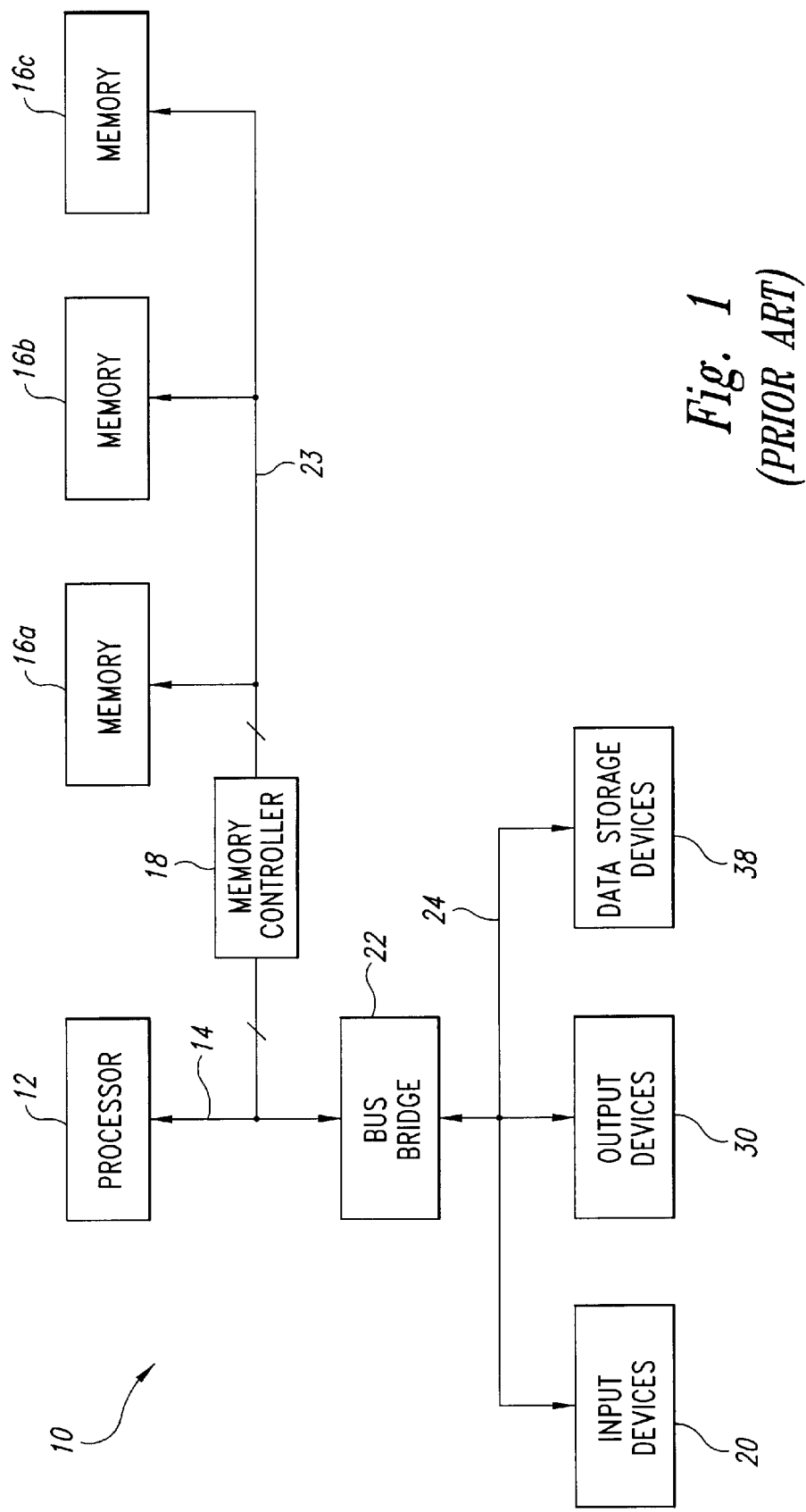
FIG. 1 is a block diagram of a conventional computer system including a plurality of packetized memory devices.
Figure 2:
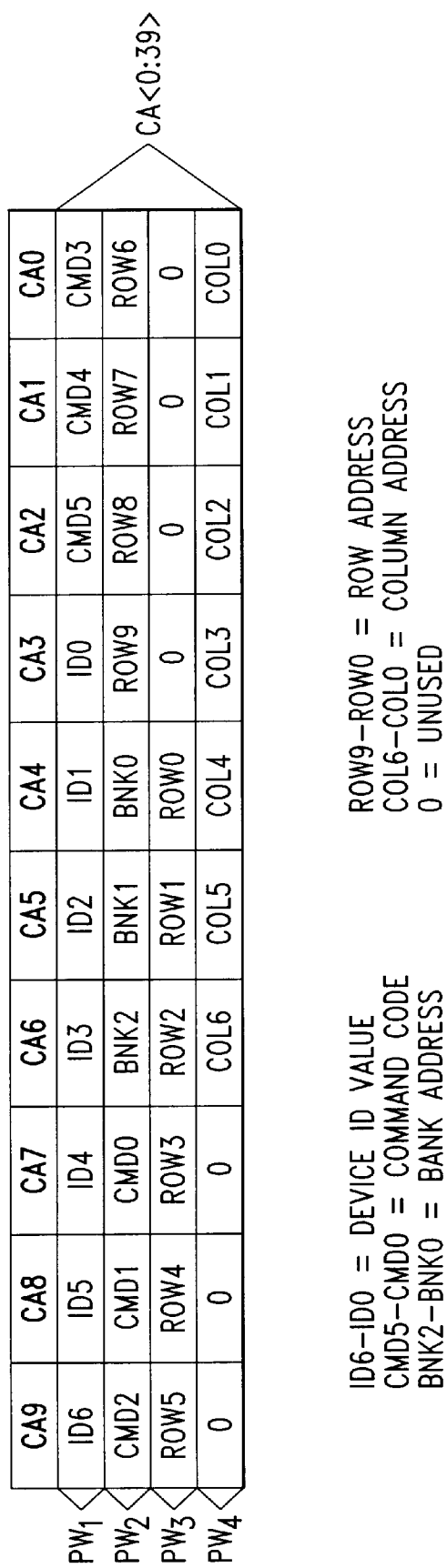
FIG. 2 is diagram showing a typical command packet received by the packetized memory devices of FIG. 1.

In operation, when the packetized memory device 16a containing the bit-to-bit synchronization circuit 400 operates in the synchronization mode, which is initiated by the FLAG signal going active high for one cycle of the CCLK signal, the bit-to-bit synchronization circuit 400 sequentially adjusts the respective phases of the clock signals CLKCA0–CLKCA9 and CLKF, as will now be explained in more detail. To place the packetized memory device 16a including the synchronization circuit 400 in the synchronization mode of operation, the memory controller 18 (FIG. 1) applies a 15-bit repeating pseudo-random bit sequence on each line of the command bus CA, and on the flag line 52 receiving the FLAG signal. One 15-bit repeating pseudo-random bit sequence that may be applied on these lines is shown in Table 1 below.

As seen from Table 1, the 15-bit pseudo-random bit sequence is complemented on adjacent lines of the command bus CA. Thus, for example, the sequence starts with 0000 for the signal CA<9>, 1111 for the signal CA<8>, 0000 for the signal CA<7>, and so on, such that the sequence supplied on each line is the complement of the sequence applied on adjacent lines.

In response to the applied 15-bit pseudo-random bit sequence, the synchronization circuit 400 places the packetized memory device 16a in synchronization mode of operation. More specifically, as shown in Table 1, the pseudo-random bit sequence begins with consecutive 1's for the FLAG signal. As previously described, in response to two consecutive 1's latched for the FLAG signal, the synchronization detection circuit 414 activates the CAL signal placing the synchronization circuit 400 and the packetized memory device 16a in the synchronization mode of operation. In response to the active CAL signal, the control circuit 410 develops the phase command words FCMDPH<0:3>, CA0CMDPH<0:3>–CA9CMDPH<0:3>, and generates the control signals 412 to independently adjust the respective phases of the clock signals CLKCA0–CLKCA9 and CLKF, as will now be described in more detail. Note that prior to entering the synchronization mode of operation, the control circuit 410 outputs FCMDPH<0:3>, CA0CMDPH<0:3>–CA9CMDPH<0:3> words causing the corresponding clock signals CLKF,CLKCA0–CLKCA9 to have respective phases determined during a previous synchronization mode or default values in response to a predetermined event such as reset of the memory device 16a.

After receiving the active CAL signal, the control circuit 410 generates the bit select word BITSEL<0:3>, causing the multiplexer 420 to apply the FLAT<0:3> word to the evaluation circuit 420. At this point, the control circuit 410 also applies the flag phase command word FCMDPH<0:3> to the multiplexer 416 which, in turn, clocks the synchronization detection circuit 414 with the CLKF signal having the phase $\phi_1$. The values for the phase command words CA0CMDPH<0:3>–CA9CMDPH<0:3> are unimportant at this point because although the shift registers 402a–402j latch the corresponding command signals CA<0>–CA<9> responsive to the respective clock signals CLKCA0–CLKCA9, and these values are latched and output by the storage register 418, the multiplexer 420 outputs only the FLAT<0:3> word to be evaluated by the evaluation circuit 422.

At this point, the synchronization detection circuit 414 latches the sequentially applied FLAG signals responsive to each transition of the CLKF signal having the phase 41. As previously described, when four FLAG signals have been latched, the synchronization detection circuit 414 outputs the FLAT<0:3> word and thereafter generates the CTRIGGER pulse. The storage register 418 latches the FLAT<0:3> word, along with the CA0<0:3>–CA9<0:3> words, in response to the CTRIGGER pulse, and the multiplexer 420

TABLE 1

| FLAG | 1 | 1 | 1 | 1 | 0 | 1 | 0 | 1 | 1 | 0 | 0 | 1 | 0 | 0 | 0 |
|---|---|---|---|---|---|---|---|---|---|---|---|---|---|---|---|
| CA <9> | 0 | 0 | 0 | 0 | 1 | 0 | 1 | 0 | 0 | 1 | 1 | 0 | 1 | 1 | 1 |
| CA <8> | 1 | 1 | 1 | 1 | 0 | 1 | 0 | 1 | 1 | 0 | 0 | 1 | 0 | 0 | 0 |
| CA <7> | 0 | 0 | 0 | 0 | 1 | 0 | 1 | 0 | 0 | 1 | 1 | 0 | 1 | 1 | 1 |
| . | . | . | . | . | . | . | . | . | . | . | . | . | . | . | . |
| . | . | . | . | . | . | . | . | . | . | . | . | . | . | . | . |
| . | . | . | . | . | . | . | . | . | . | . | . | . | . | . | . |
| CA <0> | 1 | 1 | 1 | 1 | 0 | 1 | 0 | 1 | 1 | 0 | 0 | 1 | 0 | 0 | 0 | outputs this latched FLAT<0:3> word to the evaluation circuit 422. The evaluation circuit 422 receives the latched FLAT<0:3> word from the multiplexer 420 and compares this latched word to expected values determined by the SYNCSEQ<0:3> word generated by the pattern generator 424, which generates the SYNCSEQ<0:3> word in response to the FLAT<0:3> word, as will be explained in more detail below. When each of the bits in the latched FLAT<0:3> word has its expected value determined by the SYNCSEQ<0:3> word, the evaluation circuit 422 drives the CINITRES signal active high, indicating the FLAG signal was successfully captured at the current phase $\phi_1$ of the CLKF signal. If any of the bits in the FLAT<0:3> word does not have its expected value, the evaluation circuit 422 drives the CINITRES signal inactive low, indicating the FLAG signals comprising the FLAT<0:3> word were not successfully captured at the current phase of the CLKF signal. In one embodiment, a plurality of FLAT<0:3> words are compared to their corresponding expected values at a given phase $\phi$ of the CLKF signal such that all 15 possible four-bit combinations of this word are captured at a given phase.

The control circuit 410 stores the value of the CINITRES signal output by the evaluation circuit 422, and thereafter increments the value of the flag phase command word FCMDPH<0:3>. In response to the incremented FCMDPH<0:3> word, the multiplexer 416 now clocks the shift register and synchronization detection circuit 414 with the clock signal CLKF having the phase $\phi_2$. This CLKF signal clocks the synchronization detection circuit 414, which sequentially latches the next four applied FLAG signals responsive to the CLKF signal, and once again generates the CTRIGGER pulse after these signals have been latched. In response to the CTRIGGER signal, the storage register 414 latches the new FLAT<0:3> word from the circuit 414, and outputs this latched word to the multiplexer 420 which, in turn, applies the word to the evaluation circuit 422. The evaluation circuit 422 compares the new FLAT<0:3> word to its expected value determined by the new SYNCSEQ<0:3> word generated by the pattern generator 424, and generates the resulting CINITRES signal on its output. The control circuit 410 once again stores the value of the CINITRES signal.

The control circuit 410 continues incrementing the flag phase command word FCMDPH<0:3> and generating the appropriate control signals to store sixteen values for the CINITRES signal, each value corresponding to a particular value of the phase command word FCMDPH<0:3> word (i.e., a corresponding one of the phases $\phi_1$–$\phi_n$ of the CLKF signal). After sixteen values for the CINITRES signal have been stored, the control circuit 410 executes a phase selection procedure to select a final flag phase command word FCMDPH<0:3> from among the flag phase command words that resulted in the successful capture of the FLAG signal. One procedure that may be executed by the control circuit 410 in determining the final phase command word is described in the previously referenced U.S. patent application Ser. No. 08/890,055 to Baker et al., which has been incorporated herein by reference. Upon determining the final phase command word FCMDPH<0:3>, the control circuit 410 stores this value and continually applies it to the multiplexer 416 during normal operation of the packetized memory device 16a (FIG. 3) containing the synchronization circuit 400. At this point, the control circuit 410 has determined an optimal phase of CLKF signal that will be utilized to latch the FLAG signal.

After the control circuit 410 has determined the final flag phase command word FCMDPH<0:3>, the control circuit increments the bit select word BITSEL<0:3>, causing the multiplexer 420 to apply the CA0<0:3> word from the storage register 418 to the evaluation circuit 422. The control circuit 410 thereafter operates in the same way as previously described for the CLKF signal to determine an optimal phase for the CLKCA0 signal. In other words, the control circuit 410 increments the phase command word CA0CMDPH<0:3> applied to the multiplexer 401a, stores the corresponding CINITRES signals generated by the evaluation circuit 422, and determines the final phase command word CA0CMDPH<0:3> (i.e., determines the phase $\phi_1$–$\phi_n$ of the clock signal CLKCA0). After determining the final CA0CMDPH<0:3> word, the control circuit 410 thereafter operates identically to sequentially determine final phase command words CA1CMDPH<0:3>–CA9CMDPH<0:3> and thereby adjust the respective phases of the clock signals CLKCA1–CLKCA9. In this way, the synchronization circuit 400 independently adjusts the phase of each of the clock signals CLKF and CLKCA0–CLKCA9 so that command packet words CA<0:9> and the coincident FLAG signals are successfully captured during normal operation of the packetized memory device 16a containing the synchronization circuit 400. As previously mentioned, the synchronization circuit 400 may operate in an analogous manner to adjust the respective phases of a plurality of internal clock signals utilized to capture respective data signals applied on the data bus DQ.

Figure 6:
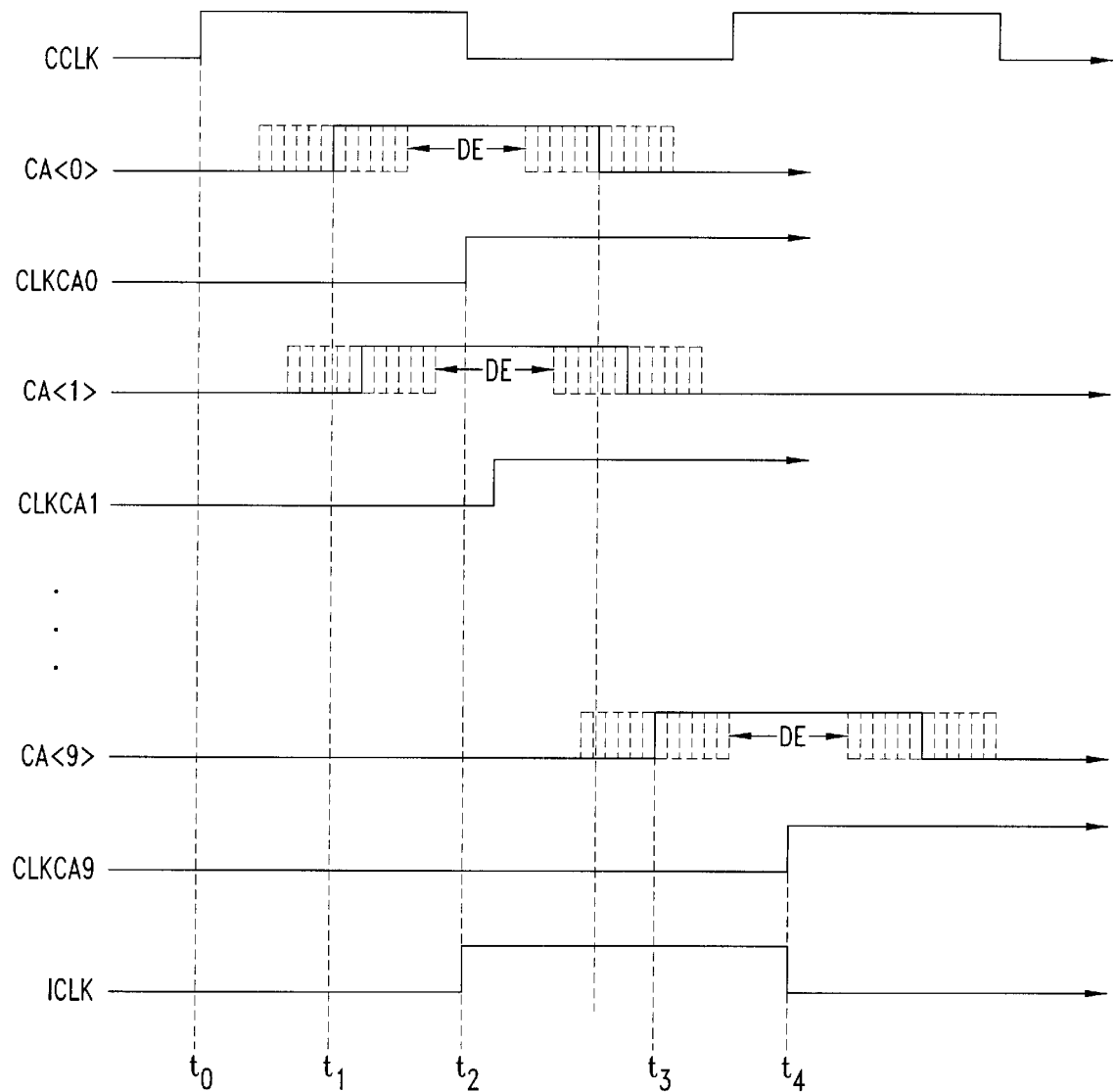
FIG. 6 is a timing diagram illustrating operation of the bit-to-bit synchronization circuit of FIG. 5.

FIG. 6 is a timing diagram illustrating the operation of the synchronization circuit 400 in successfully capturing command signals CA<0>–CA<9> and FLAG signals applied to the packetized memory device 16a at high data transfer rates. In the example of FIG. 6, the CCLK signal goes high at a time t0, and the ideal command signal CA<0>, which is indicated by the solid line, goes valid a short time later at a time $t_1$. The dashed lines indicate the timing skew of the actual CA<0> signal resulting from such factors as the noise coupled to the CA<0> signal line, transmission line reflections, or induced voltages on power supply busses of the circuit 400, as was previously described. The timing skew reduces the data eye DE of the CA<0> signal and thereby reduces the valid duration during which the CA<0> signal must be captured. The CLKCA0 signal has a phase shift defined by the determined final phase command CA0CMDPH<0:3>, and goes high at a time $t_2$. In response to the CLKCA0 signal going high, the register 402a (FIG. 5) successfully latches the valid CA<0> signal at the time $t_2$. The CA<1> signal is shown having a slight delay relative to the CA<0> signal, and the CLKCA1 signal goes high just after time $t_2$ in the center of the data eye DE of the CA<1> signal. The CLKCA1 signal has a phase determined by the final phase command CA1CMDPH<0:3>, and when the CLKCA1 signal goes high, the corresponding register 402b (FIG. 5) successfully latches the valid CA<1> signal at just after the time $t_2$. In the example of FIG. 6, the ideal CA<9> signal goes valid at a time $t_3$ and is captured by the rising edge transition of the CLKCA9 signal at a time $t_4$ in the center of the data eye DE of the CA<9> signal. In the example of FIG. 6, the CA<0>, CA<1>, and CA<9> signals are successfully latched responsive to the respective clock signals CLKCA0, CLKCA1, and CLKCA9 having phases determined by the phase commands CADCMDPH<0:3>, CA1CMDPH<0:3>, and CA9CMDPH<0:3>, respectively.

FIG. 6 also illustrates a situation where a single internal clock signal ICLK having a phase relative to the CCLK signal cannot be used to successfully capture all command signals CA<0>–CA<9>. This is true because the command signals CA<0> and CA<1> go invalid before the data eye DE of the CA<9> signal centered at time $t_4$, which is when the CA<9> signal is valid. More specifically, in the example of FIG. 6 all the signals CA<0>, CA<1>, and CA<9> are in the same packet word CA<0:9> applied on the command bus CA by the memory controller 18 (See FIG. 1). Thus, the memory controller 18 simultaneously applies the CA<0>, CA<1>, and CA<9> signals on their respective lines of the CA bus. Due to factors such as different line lengths or different capacitances of the lines receiving the CA<0>, CA<1>, and CA<9> signals, as previously described, the times at which the valid CA<0> and CA<9> signals arrive at the packetized memory device 16a are different. In other words, the data eyes DE of the CA<0>, CA<1>, and CA<9> signals do not overlap. More specifically, the center of data eye of the CA<9> signal is not until the time $t_4$, which is after the termination of the data eyes DE of the CA<0> and CA<1> signals. In this situation, the single ICLK signal going high at the time $t_2$ will successfully capture the CA<0> and CA<1>signals, but not the CA<9> signal. Conversely, the single ICLK signal going low at the time $t_4$ will successfully capture the CA<9> and CA<1> signals.

The situation illustrated in FIG. 6 may arise as the valid duration or data eye of the CA<0>–CA<9> signals in applied packet words CA<0:9> decreases with increasing data transfer rates. As the data eyes of the CA<0>–CA<9> signals decrease, a single ICLK signal may not be used to successfully capture each of the CA<0>–CA<9> signals in an applied packet word. By independently adjusting the phases shifts of the respective clock signals CLKF and CLKCA0–CLKCA9 utilized to capture respective FLAG and CA<0>–CA<9> signals, the synchronization circuit 400 successfully captures these signals notwithstanding the decrease in the data eyes at high data transfer rates.

The pattern generator 424 may be a conventional pattern recognition circuit which, upon receiving the FLAT<0:3> word equal to 1111, thereafter generates the predetermined sequence of values defined by the repeating 15 bit pseudo-random bit sequence applied on FLAG and CA lines (see Table 1). In other words, the pseudo-random bit sequences starts with 1111 applied for the FLAG bit. The next four FLAG bits that are captured, one coincident with each packet word CA<0:9>, are 0101, followed by 1001, and so on as seen in Table 1. Thus, the pattern generator 424 merely starts generating the expected values 0101, 1001, and so on for the SYNCSEQ<0:3> word after receiving the FLAT<0:3> or DOC<0:3> word including two consecutive binary 1s (e.g., 1111). One skilled in the art will understand circuitry that may be utilized to develop the predetermined sequence of SYNCSEQ<0:3> words generated by the pattern generator 424, such as a state machine formed from appropriate logic circuitry. Alternatively, the pattern generator 424 may generate the expect data words SYNCSEQ<0:3> in response to the actual values captured for the FLAG bit, and thereafter generate expected values based upon this initial actual captured value. For example, the initial captured FLAT<0:3> word may equal 1110, which corresponds to the pattern of Table 1 shifted to the left by one bit. In this situation, the pattern generator 424 would thereafter generate expected values 1011, 0010, 0011, and so on for the SYNCSEQ<0:3> word after receiving the FLAT<0:3> word equal to 1110. The pattern generator 424 will not be described in further detail, but a more detailed description of one embodiment of the pattern generator 424 is set forth in U.S. patent application Ser. No. 09/146,860 to Manning entitled METHOD AND APPARATUS FOR GENERATING EXPECT DATA FROM A CAPTURED BIT PATTERN, AND MEMORY DEVICE USING SAME, which is incorporated herein by reference.

One skilled in the ale will realize that the procedure executed by the control circuit 410 in adjusting the respective phases of the CLKF and CLKCA0–CLKCA9 signals may vary. For example, in the above-described procedure the control circuit 410 captures only one FLAT<0:3> and CA0<0:3>–CA9<0:3> word at each phase of clock signals CLKF and CLKCA0–CLKCA9. In another embodiment, the control circuit 410 performs a predetermined number of comparisons at each phase of the respective clock signals CLKF and CLKCA0–CLKCA9. In this embodiment, the control circuit 410 may, for example, control components of the synchronization circuit 400 so that eight FLAT<0:3> words are captured and compared at each phase of the CLKF signal. When all eight of these comparisons indicate successful captures, the control circuit 410 stores a "1" for the CINITRES signal at this phase. However, if any of the comparisons at a given phase indicates an unsuccessful capture, the control circuit 410 stores a "0" for the CINITRES signal at this phase. Once again, after sixteen, for example, CINITRES signals have been stored, the control circuit 410 determines the final phase command word FCMDPH<0:3>. In this embodiment, the control circuit 410 operates in an analogous manner in determining each of the phase command words CA0CMDPH<0:3>–CA9CMDPH<0:3>.

Figure 7:
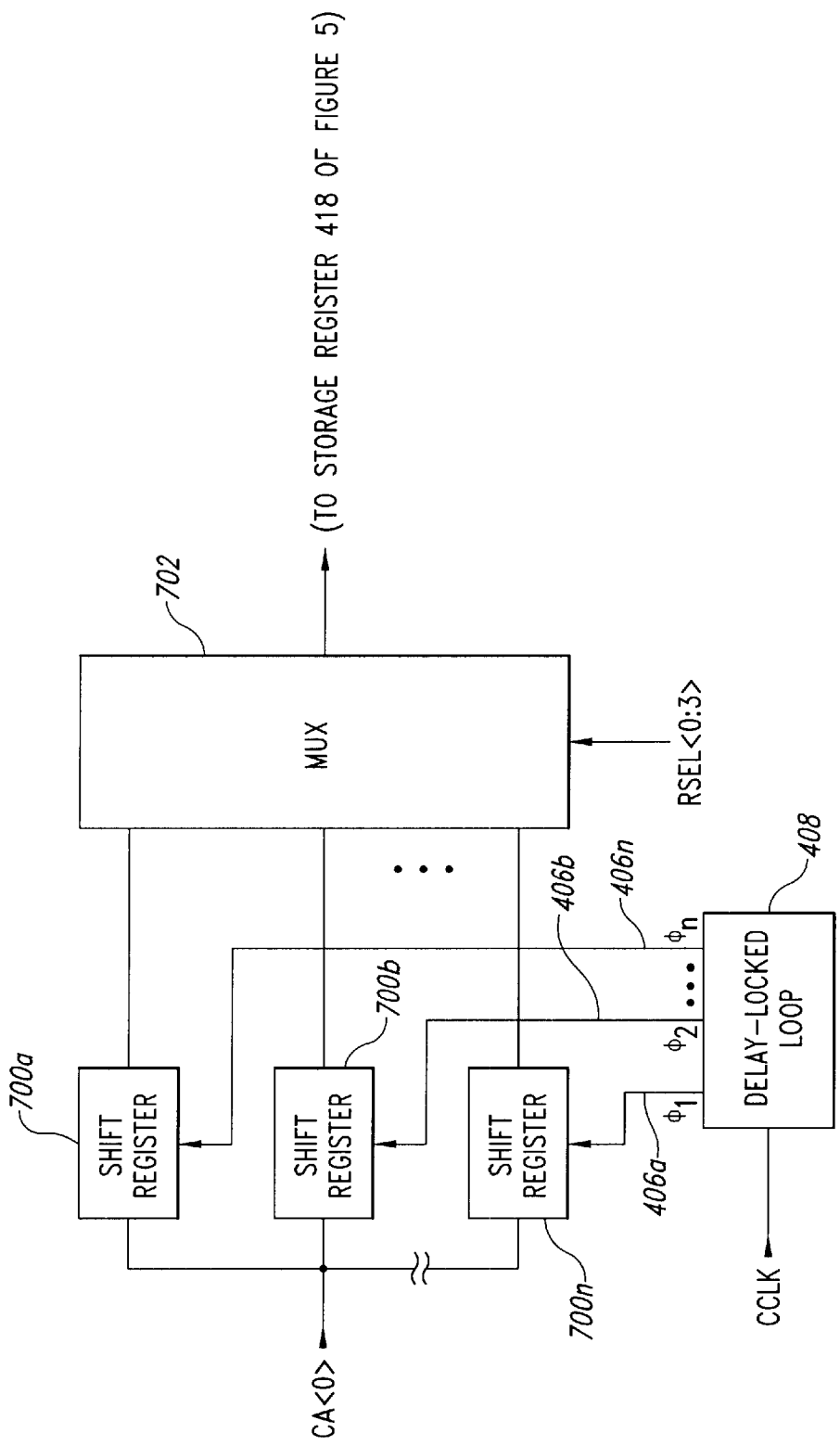
FIG. 7 is a block diagram of another embodiment of a portion of the bit-to-bit synchronization circuit of FIG. 5.

FIG. 7 illustrates an alternative embodiment of a portion of the bit-to-bit synchronization circuit 400 of FIG. 5. In the embodiment of FIG. 7, a plurality of shift registers 700a–700n are coupled to each line of the command by CA, as shown for the CA<0> line. Each of the shift registers 700a–700n is clocked by a respective one of the clock signals 406a–406n from the delay-locked loop 408. If there are n clock signals 406a–406n having phases $\phi_1$–$\phi_n$, respectively, each CA line has n shift registers coupled to it in this embodiment. The output from each of these shift registers 700a–700n is then selectively applied through a multiplexer 702 to the storage register 418 (see FIG. 5). In this embodiment, the control circuit 410 applies a register select word RSEL<0:3> to control the multiplexer 702 to apply the latched word from a selected one of the n shift registers 700a–700n to the storage register 418. The evaluation circuit 412 (FIG. 5) thereafter determines whether the corresponding CA<0:9> signal was successfully captured at the corresponding phase $\phi_1$–$\phi_n$ of the clock signal that clocks the selected shift register 700a–700n. Each shift register 700a–700n coupled to a respective CA line is sequentially selected to evaluate each of the clock signals 406a–406n clocking these shift registers. The control circuit 410 then determines the respective one of the clock signals 406a–406n having the optimum phase $\phi_1$–$\phi_n$ for capturing the corresponding CA<0:9> signal, and thereafter selects the one of the shift registers 700a–700n clocked by the respective clock signal 406a–406n having the optimum phase $\phi_1$–$\phi_n$. The selected shift register 700a–700n is then utilized to capture the corresponding CA <0:9> signal during normal operation of the packetized memory device 16a containing the circuit 400.

In another alternative embodiment of the synchronization circuit 400, a different type of circuit, such as a phase-locked loop, is utilized in place of the delay-locked loop 408 of FIGS. 5 and 7 to generate an internal clock signal responsive to the CCLK signal, the internal clock signal having a higher frequency than the CCLK signal. In this embodiment, the shift registers are clocked responsive to particular edges of this high frequency internal clock signal to thereby successfully capture the corresponding CA<0:9> signal. For example, the internal clock signal may be applied to clock a plurality of counters, each counter having a different count and an output from each counter being applied to clock a respective shift register upon the counter reaching its count. In this embodiment, the control circuit 410 (FIG. 5) then determines which counter output should be utilized to clock each shift register so that the corresponding CA<0:9> signal is successfully captured.

Figure 8:
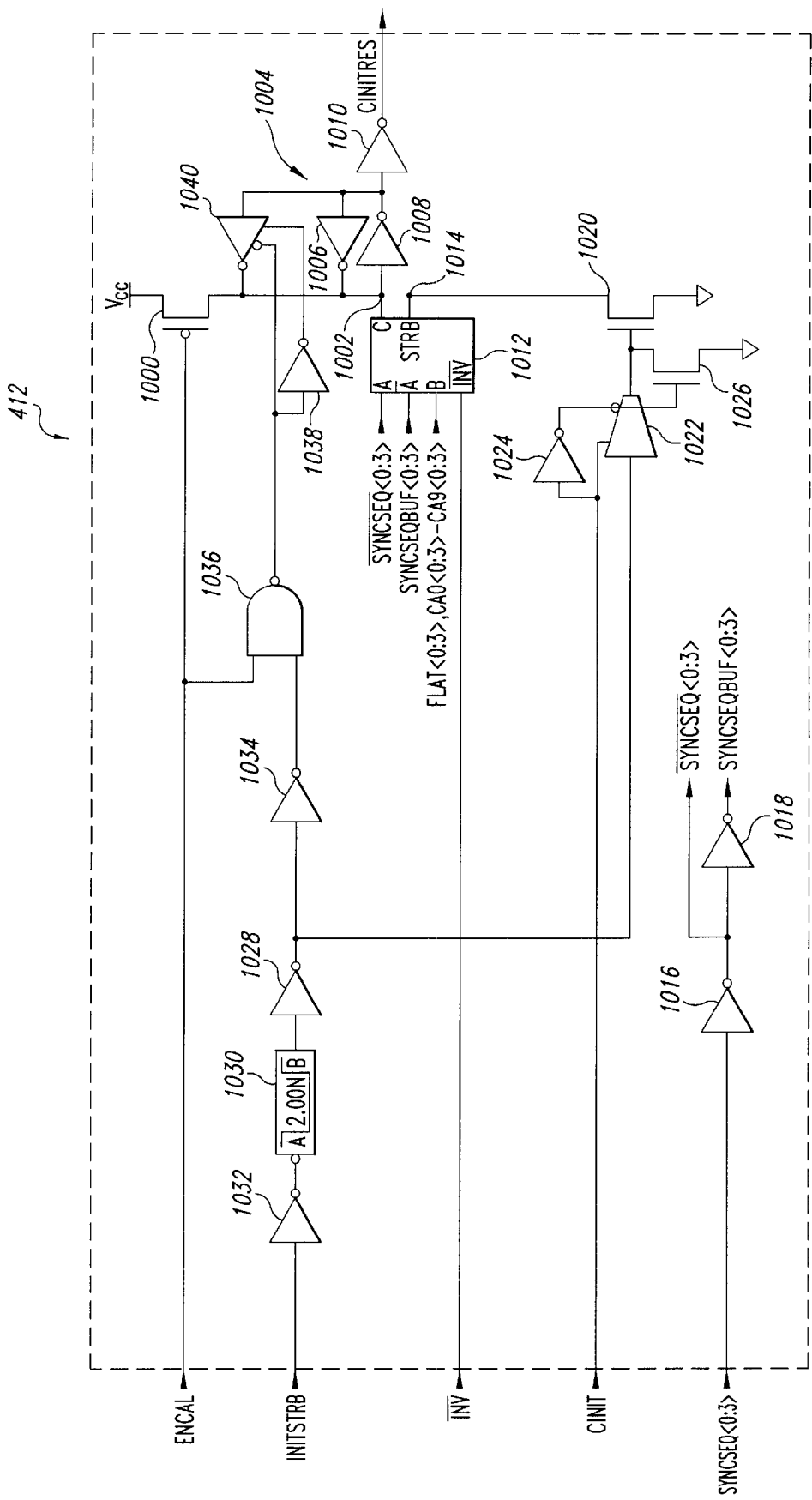
FIG. 8 is a schematic of one embodiment of the evaluation circuit of FIG. 5.

The overall operation of the bit-to-bit synchronization circuit 400 and general operation of several components within that circuit have now been described with reference to FIGS. 5 and 6. At this point, several components of the bit-to-bit synchronization circuit 400 will now be described in more detail. FIG. 8 illustrates one embodiment of the evaluation circuit 422 of FIG. 5, which, as previously described, compares the word FLAT<0:3>, CA0<0:3>–CA9<0:3> from the multiplexer 420 to expected values determined by the SYNCSEQ<0:3> word, and generates the CINITRES signal having a value indicating the result of this comparison. The evaluation circuit 422 includes a PMOS reset transistor 1000 coupled between a supply voltage source $V_{CC}$ and a sensing node 1002, and receiving an enable calibration signal ENCAL from the control circuit 410 applied on its gate. A latch 1004 including two cross-coupled inverters 1006, 1008 has its input coupled to the sensing node 1002 and its output coupled to an input of an inverter 1010 which develops the CINITRES signal on its output in response to the output of the latch 1004.

The evaluation circuit 422 further includes a compare circuit 1012 coupled between the sensing node 1002 and an enable node 1014. The compare circuit 1012 sequentially receives each bit of each one of the latched words FLAT<0:3>,CA0<0:3>–CA9<0:3> from the multiplexer 420, and further receives a plurality of signals derived from the synchronization sequence word SYNCSEQ<0:3> generated by the control circuit 410. More specifically, each bit of the synchronization sequence word SYNCSEQ<0:3> is coupled through a respective inverter 1016 to generate a complementary synchronization sequence word $\overline{\text{SYNCSEQ}}$<0:3> which, in turn, is further coupled through a respective inverter 1018 to generate a buffered synchronization sequence word SYNCSEQBUF<0:3>. The $\overline{\text{SYNCSEQ}}$<0:3> and SYNCSEQBUF<0:3> words are utilized by the compare circuit 1012 in determining whether each of the bits in the applied word FLAT<0:3>, CA0<0:3>–CA9<0:3> has its expected value, as will be explained in more detail below. The compare circuit 1012 further receives an invert signal $\overline{\text{INV}}$ from the control circuit 410 which, as will be described in more detail below, is utilized to enable the same circuitry within the compare circuit to compare all the FLAG and CA<0>–CA<9> signals even though adjacent signals are complemented as previously described with reference to Table 1.

The evaluation circuit 422 further includes an enable transistor 1020 coupled between the enable node 1014 and ground. An inverter 1028 has its output applied through a transmission gate 1022 to the gate of the enable transistor 1020. The control circuit 410 applies a command initialization signal CINIT directly and through an inverter 1024 to the control terminals of the transmission gate 1022. The output of the inverter 1024 is further applied to a gate of a transistor 1026 coupled between the gate of the enable transistor 1020 and ground. When the CINIT signal goes active high, the inverter 1024 drives its output low turning OFF the transistor 1026 and turning ON the transmission gate 1022 and thereby coupling the output of the inverter 1028 to the gate of the enable transistor 1020. Thus, when the CINIT signal is active high, the level at the output of the inverter 1028 determines whether the enable transistor 1020 turns ON or OFF. The control circuit 410 applies an initialization strobe signal INITSTRB through an inverter 1032 to an input of a pulse generator 1030 which, in turn, outputs a pulse signal to the input of the inverter 1028. When the INITSTRB signal goes active high, the inverter 1032 drives its output low causing the pulse generator 1030 to apply a low pulse signal on the input of the inverter 1028, which, in turn, drives its output high for the duration of this pulse. This high output from the inverter 1028 is coupled through the transmission gate 1022, when activated, turning ON the enable transistor 1022.

The output of the inverter 1028 is further coupled through an inverter 1034 to one input of a NAND gate 1036 receiving the ENCAL signal on a second input. The output of the NAND gate 1036 is applied directly and through an inverter 1038 to enable terminals of a buffer 1040 coupled between the output of the latch 1004 and the sensing node 1002 as shown. When the output of the NAND gate 1036 goes low, the buffer 1040 is enabled and applies the inverse of the signal on the output of the latch 1004 on the sensing node 1002. If the output of the NAND gate 1036 is high, the buffer 1040 is disabled, placing its output in a high impedance state.

Figure 9:
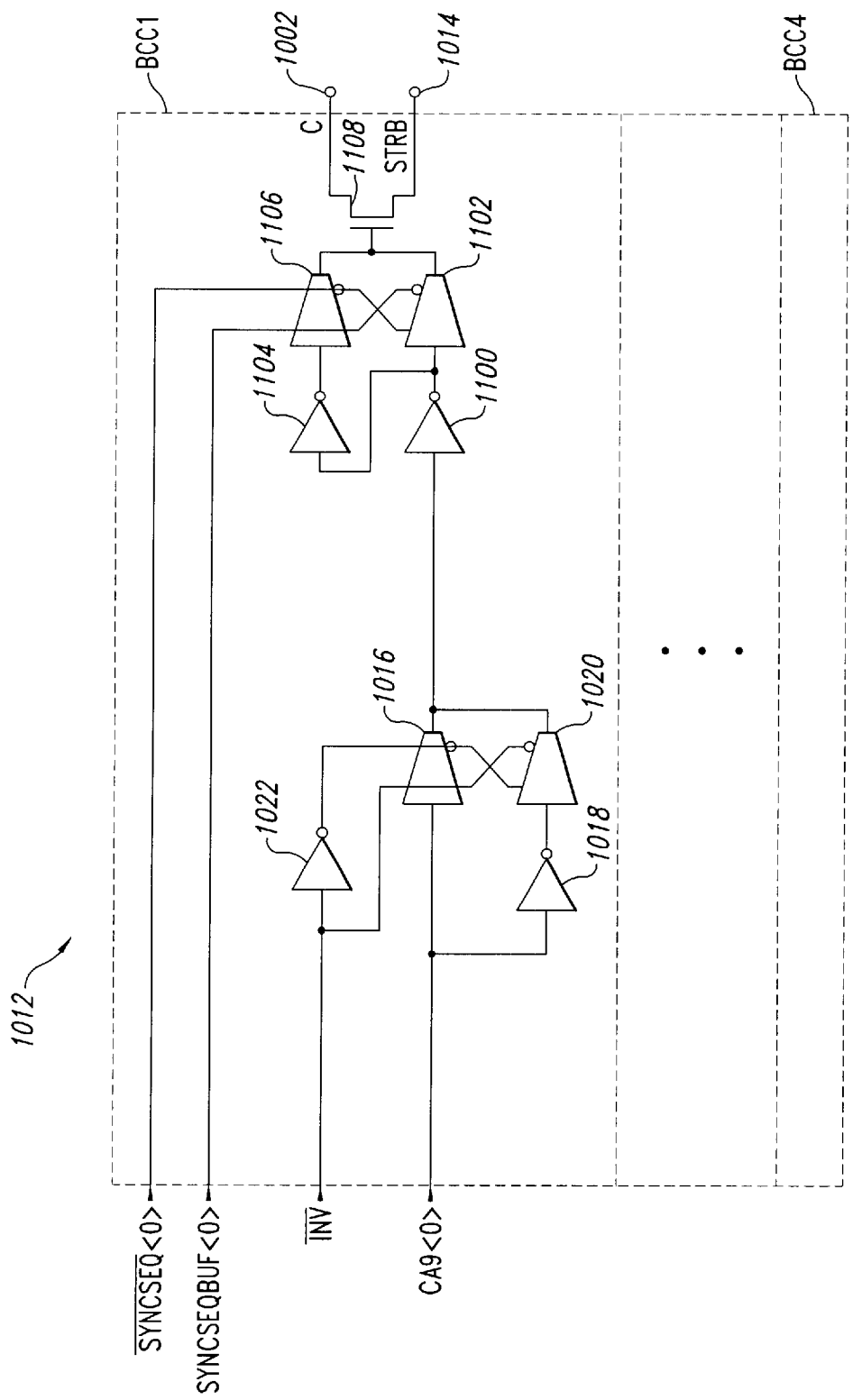
FIG. 9 is a schematic of one embodiment of the compare circuit of FIG. 8.

FIG. 9 is a more detailed schematic of the compare circuit 1012 of FIG. 8 including a plurality of bit compare circuits BCC1–BCCN. There is one bit compare circuit BCC1-BCCN for each bit compared by the compare circuit 1012. In the embodiment of FIG. 9, the compare circuit 1012 includes 4 bit compare circuits BCC1–BCCN, one for each bit in each of the words FLAT<0:3> and CA0<0:3>–CA9<0:3>. All the bit compare circuits BCC1–BCCN are identical, and thus, for the sake of brevity, only the bit compare circuit BCC1 will be described in more detail. In the following description, it is assumed the bit compare circuit BCC1 receives the bit CA9<0> of the word CA9<0:3>, which would occur when the multiplexer 420 (FIG. 5) outputs the CA9<0:3> word during synchronization of the clock signal CLKCA9. The CA9<0> bit is applied through a transmission gate 1016 and through an inverter 1100 to an input of a transmission gate 1102, and an inverter 1018 applies the complement of the CA9<0> bit through a transmission gate 1020 and then through the first inverter 1100 to the input of the transmission gate 1102. The transmission gates 1016,1020 receive the $\overline{\text{INV}}$ signal directly and through an inverter 1022 on their respective control terminals as shown, and are activated in a complementary manner in response to the $\overline{\text{INV}}$ signal. When the $\overline{\text{INV}}$ signal is active low, the transmission gate 1016 turns OFF and transmission gate 1020 turns ON, coupling the complement of the CA9<0> signal to the inverter 1100. In contrast, when the $\overline{\text{INV}}$ signal is inactive high, the transmission gate 1020 turns OFF and transmission gate 1016 turns ON coupling the CA9<0> signal to the inverter 1100. The output of the inverter 1100 is further applied through an inverter 1104 to the input of a transmission gate 1106. The transmission gates 1102 and 1106 receive the $\overline{\text{SYNCSEQ}}$<0> and SYNCSEQBUF<0> signals on their respective control terminals as shown, and are activated in a complementary manner in response to the values of these signals. When the $\overline{\text{SYNCSEQ}}$<0> signal is high and SYNCSEQBUF<0> signal is low, the transmission gate 1102 turns ON and transmission gate 1106 turns OFF, and when the signals $\overline{\text{SYNCSEQ}}$<0> and SYNCSEQBUF<0> are low and high, respectively, the transmission gate 1106 turns ON and transmission gate 1102 turns OFF. The outputs of the transmission gates 1102 and 1106 are applied to a gate of a comparison transistor 1108 coupled between the sensing node 1002 and the enable node 1014.

In operation, the bit compare circuit BCC1 compares the value of the bit CA9<0> to its expected value determined by the values of the bits $\overline{\text{SYNCSEQ}}$<0> and SYNCSEQBUF<0>, and activates the compare transistor 1108 when the bit CA9<0> does not have its expected value, as will now be explained in more detail. The control circuit 410 controls the $\overline{\text{INV}}$ in response to which of the FLAG, CA<0>–CA<9> signals is being compared to thereby apply either the true or complement of this signal to the input of the inverter 1100. When any of the FLAG,CA<0,2,4,6,8> signals is being compared, the control circuit 410 deactivates the $\overline{\text{INV}}$ signal since the true pseudo-random bit sequence is applied for these signals (See Table 1), and when any of the bits CA<1,3,5,7,9>is being compared, the control circuit 410 actives the $\overline{\text{INV}}$ signal since the complemented pseudo-random bit sequence is applied for these signals. In this way, when the true pseudo-random bit sequence is being captured the corresponding signal is applied directly to the input of the inverter 1100, and when the complemented pseudo-random bit sequence is being captured the complemented signal is applied to the input of the inverter 1100.

The pattern generator 424 (see FIG. 5) generates expected values for captured bits in the true pseudo-random bit sequence. Thus, the actual expected value of the data bit CA9<0> is actually the complement of the expected value determined by the pattern generator. When the CA<9> signal is being compared, the control circuit 410 actives the $\overline{\text{INV}}$ signal, coupling the complement of the CA9<0> bit to the inverter 1100 such that the value at the input of the inverter 1100 is the same as the expected value determined by the pattern generator 424. When the expected value of the data bit CA9<0> is a binary 1, meaning the actual captured CA9<0> bit should be a binary 0, the pattern generator 424 generates $\overline{\text{SYNCSEQ}}$<0> and SYNCSEQBUF<0> signals that are high and low, respectively, turning ON transmission gate 1102 and turning OFF transmission gate 1106. In this situation, the complement of the CA9<0> bit, which is a binary 1, is applied through the inverter 1100 and through the turned ON transmission gate 1102 to the gate of the compare transistor 1108. If the complement of the CA9<0> bit is a binary 1 as expected, the inverter 1100 applies a low signal through the transmission gate 1102 to the gate of the compare transistor 1108, turning OFF this transistor. In contrast, if the complement of data bit CA9<0> is a binary 0 instead of a binary 1 as expected, the inverter 1100 drives its output high and this high output is applied through the transmission gate 1102 to the gate of the transistor 1108. In response to the high signal on its gate, the transistor 1108 turns ON, coupling the sensing node 1002 to the enable node 1014.

When the expected value generated by the pattern generator 424 is a binary 0, the pattern generator 424 drives the $\overline{\text{SYNCSEQ}}$<0> and SYNCSEQBUF<0> signals low and high, respectively, turning ON the transmission gate 1106 and turning OFF the transmission gate 1102. In this situation, the complement of the CA9<0> bit applied to the input of the inverter 1100 is a binary 0 as well since the actual value of CA9<0> is a binary 1, which is applied through the inverter 1018 and gate 1020 to the inverter 1100. The complement of the data bit CA9<0> is then applied through the inverters 1100 and 1104 and through the turned ON transmission gate 1106 to the gate of the compare transistor 1108. If the complement of the data bit CA9<0> is a binary 0 as expected, the inverter 1104 drives its output low, turning OFF the transistor 1108 and isolating the sensing node 1002 from the enable node 1014. In contrast, if the complement of the data bit CA9<0> is not a binary 0 as expected but is instead a binary 1, the inverter 1104 drives its output high, turning ON the transistor 1108 which couples the sensing node 1002 to the enable node 1014. When any of the bits FLAG,CA<0,2,4,6,8> is being compared, the expected value generated by the pattern generator 424 corresponds to the actual captured bit so the control circuit 401 drives the $\overline{\text{INV}}$ signal is inactive high, applying the captured bit directly through the transmission gate 1016 to the inverter 1100.

Returning now to FIG. 8, the overall operation of the evaluation circuit 422 in comparing the value of each bit in the applied word FLAT<0:3>,CA0<0:3>–CA9<0:3> to its expected value will now be described in more detail. As previously described with reference to FIG. 5, the control circuit 410 applies the CINIT, ENCAL, $\overline{\text{INV}}$, and INITSTRB signals (i.e., indicated as control signals 412 in FIG. 5) to control operation of the evaluation circuit 422. The control circuit 410 controls the $\overline{\text{INV}}$ signal as previously described with reference to FIG. 9, activating the $\overline{\text{INV}}$ signal when evaluating the respective CA<1,3,5,7> signals and deactivating the $\overline{\text{INV}}$ signal when evaluating the respective FLAG,CA<0,2,4,6,8> signals. When the CINIT signal is inactive low, the transmission gate 1022 turns OFF and the transistor 1026 turns ON. The turned ON transistor 1026 couples the gate of the enable transistor to ground, turning OFF the enable transistor 1020 which isolates the enable node 1014 from ground. In this situation, the evaluation circuit 422 is deactivated and does not evaluate the received FLAT<0:3>,CA0<0:3>–CA9<0:3> word.

The evaluation circuit 422 is enabled when the CINIT signal is active high turning ON the transmission gate 1022 and enable transistor 1020, which couples the enable node 1014 to approximately ground. The ENCAL signal goes inactive low before evaluation of each applied data word. In response to the low ENCAL signal, the transistor 1000 turns ON, coupling the sensing node 1002 to approximately the supply voltage $V_{CC}$. In response to the high on the sensing node 1002, the latch 1004 drives its output low and the inverter 1010, in turn, drives the CINITRES signal on its output high. At this point, the INITSTRB signal is inactive low and the pulse generator 1030 drives its output high causing the inverter 1028 to drive its output low. The low output from the inverter 1028 is applied through the turned ON transmission gate 1022 to the gate of the enable transistor 1020, turning OFF this transistor and thereby isolating the enable node 1014 from ground. It should be noted that when the ENCAL signal goes inactive low, the NAND gate 1036 deactivates the buffer 1040 enabling the transistor 1000 to more easily drive the sensing node 1002 high.

Once the ENCAL signal has gone inactive low, disabling and resetting the evaluation circuit 422, the ENCAL signal thereafter goes active high, enabling the evaluation circuit 422 to begin comparing the applied one of the FLAT<0:3>, CA0<0:3>–CA9<0:3> words. At this point, the control circuit 410 applies the generated synchronization sequence word SYNCSEQ<0:3> to the evaluation circuit 422 and the corresponding $\overline{\text{SYNCSEQ}}$<0:3> and SYNCSEQBUF<0:3> words are, in turn, applied to the compare circuit 1012, indicating the expected value for each of the bits in the applied word. At this point, the expected data in the form of the $\overline{\text{SYNCSEQ}}$<0:3> and SYNCSEQBUF<0:3> words and the respective one of the FLAT<0:3>,CA0<0:3>–CA9<0:3> words are applied to the compare circuit 1012, but the compare circuit 1012 is not yet enabled since the transistor 1020 is turned OFF. The INITSTRB signal then goes active high and the pulse generator 1030, in turn, generates the low pulse on its output, causing the inverter 1028 to pulse its output high and thereby turn ON the enable transistor 1020 so that the compare circuit 1012 compares the applied FLAT<0:3>,CA<0:3>–CA9<0:3> word.

As previously described with reference to FIG. 9, when each bit of the applied FLAT<0:3>,CA0<0:3>–CA9<0:3> word has its expected value, the corresponding compare transistor 1108 coupled between the sensing node 1002 and enable node 1014 does not turn ON. Thus, when the applied word has its expected value, none of the transistors 1108 in the compare circuit 1012 turns ON and the sensing node 1002 remains at approximately the supply voltage $V_{CC}$. Accordingly, when the applied FLAT<0:3>, CA0<0:3>–CA9<0:3> word has its expected value, the voltage on the sensing node 1002 remains high such that the latch 1004 maintains its output low and the inverter 1010 continues driving the CINITRES signal active high indicating the applied word was successfully captured. If any of the bits in the applied FLAT<0:3>,CA0<0:3>–CA9<0:3> word does not have its expected value, the corresponding compare transistor 1108 turns ON, coupling the sensing node 1002 to approximately ground. When the sensing node 1002 goes low, the latch 1004 drives its output high causing the inverter 1010 to drive the CINITRES signal low, indicating the applied word was not successfully captured.

It should be noted that the low pulse on the output of the pulse generator 1030 results in the inverter 1034 also pulsing its output low, which causes the NAND gate 1036 to drive its output high for the duration of this pulse. As previously described, when the output of the NAND gate 1036 goes high, the buffer 1040 is disabled to enable the sensing node 1002 to be more easily driven low if any of the bits were not successfully captured. After the end of the pulse generated by the pulse generator 1030, the NAND gate 1036 again drives its output low enabling the buffer 1040 to drive the sensing node 1002 to its desired value. As will be understood by one skilled in the art, the sensing node 1002 may present a rather large capacitance due to all the components coupled in parallel to this node, and the buffer 1040 includes transistors sized such that the buffer 1040 may drive this relatively large capacitance to its desired voltage and in this way assists the inverter 1006, which typically has smaller sized transistors.

It is to be understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A method of capturing digital signals applied on a bus including a plurality of lines, each line coupled to a respective latch, comprising:
   generating a plurality of first clock signals responsive to a second clock signal, each first clock signal being applied to an associated latch and having a phase shift relative to the digital signal applied to the associated latch;
   storing each of the digital signals in the corresponding latch responsive to the associated first clock signal; and
   adjusting the respective phase shifts of the first clock signals to successfully capture each of the digital signals in the corresponding latch.

2. The method of claim 1 wherein the bus comprises data, address, and control busses of a memory device.

3. The method of claim 2 wherein the memory device comprises a packetized memory device and the digital signals comprise digital signal packets, each digital signal packet comprising at lease one packet word and each packet word comprising a plurality of digital signals applied on respective lines of the busses.

4. The method of claim 1 wherein adjusting the respective phase shifts of the first clock signals comprises:
   repetitively applying digital signals having expected values to the respective latches;
   evaluating the digital signals stored in each latch responsive to the associated first clock signal to determine if the stored digital signals have the expected values;
   identifying each phase of the respective first clock signals that caused the associated latch to store the corresponding digital signal having the expected values;
   selecting a phase for each of the first clock signals from one of the phases that caused the associated latch to store the digital signal having the expected values; and
   adjusting the phase of each of the first clock signals to the corresponding selected phase.

5. The method of claim 4 wherein evaluating the digital signals stored in each latch to determine if the stored digital signals have the expected values through adjusting the phase of each of the first clock signals to the corresponding selected phase are performed sequentially on each of the first clock signals until respective phases have been sequentially selected for every first clock signal.

6. The method of claim 4 wherein evaluating the digital signals stored in each latch to determine if the stored digital signals have the expected values comprises:
   storing digital signals in one of the latches responsive to the associated first clock signal;
   generating expected values for digital signals stored in the latches responsive to the digital signals stored in the one of the latches; and
   determining the digital signals were successfully stored in a respective latch when the digital signals stored in the latch correspond to the generated expected values for those digital signals.

7. A method of capturing digital signal packets applied to a packetized memory device, each digital signal packet including at least one packet word including a plurality of digital signals applied to respective latches in the packetized memory device, comprising:
   placing the packetized memory device in a synchronization mode of operation;
   generating a plurality of internal clock signals responsive to an external clock signal, each internal clock signal being applied to an associated latch and having a phase shift relative to the digital signal applied to the associated latch;
   storing each of the digital signals in the applied packet words in the corresponding latch responsive to the associated internal clock signal; and
   adjusting the respective phase shifts of the internal clock signals to successfully capture each of the digital signals in the corresponding latch.

8. The method of claim 7 wherein placing the packetized memory device in the synchronization mode comprises capturing a FLAG signal and generating a calibration signal when the FLAG signal has a predetermined binary value for two consecutive captures.

9. The method of claim 7 wherein adjusting the respective phase shifts of the internal clock signals comprises:
repetitively applying packet words having expected values to the respective latches;
evaluating the digital signals stored in each latch responsive to the associated internal clock signal to determine if the stored digital signals have the expected values;
identifying each phase of the respective internal clock signals that caused the associated latch to store the corresponding digital signal having the expected values;
selecting a phase for each of the internal clock signals from one of the phases that caused the associated latch to store the digital signal having the expected values; and
adjusting the phase of each of the internal clock signals to the corresponding selected phase.

10. The method of claim 9 wherein evaluating the digital signals stored in each latch to determine if the stored digital signals have the expected values through adjusting the phase of each of the internal clock signals to the corresponding selected phase are performed sequentially on each of the internal clock signals until respective phases have been sequentially selected for every internal clock signal.

11. The method of claim 9 wherein evaluating the digital signals stored in each latch to determine if the stored digital signals have the expected values comprises:
storing digital signals in one of the latches responsive to the associated internal clock signal;
generating expected values for digital signals stored in the latches responsive to the digital signals stored in the one of the latches; and
determining the digital signals were successfully stored in a respective latch when the digital signals stored in the latch correspond to the generated expected values for those digital signals.

12. The method of claim 9 wherein storing each of the digital signals in the applied packet words in the corresponding latch responsive to different phases of the associated internal clock signal comprises storing groups of the applied digital signals in each latch responsive to sixteen phases of the associated internal clock signal.

13. The method of claim 12 wherein groups of the digital signals are sequentially stored in each latch and a plurality of groups are stored at each phase of the associated internal clock signal, and a respective phase is identified as causing digital signals to be stored having the expected values when every group of digital signals has the corresponding expected values.

14. A method of capturing packet words applied to a packetized memory device, each packet word including a plurality of digital signals applied to respective latches in the packetized memory device and the respective digital signals having data eyes that are offset relative to each other, comprising:
placing the packetized memory device in a synchronization mode of operation;
generating a plurality of internal clock signals responsive to an external clock signal, each internal clock signal being applied to an associated latch and having a phase shift relative to the external clock signal;
adjusting the respective phase shifts of the internal clock signals;
storing each of the digital signals in the applied packet words in the corresponding latch responsive to the associated internal clock signal at the adjusted phases;
determining a final phase shift for each internal clock signal that causes the internal clock signal to clock the corresponding latch during the data eye of the corresponding digital signal; and
clocking each of the latches with the corresponding internal clock signal having the determined final phase shift.

15. The method of claim 14 wherein determining a phase shift for each internal clock signal that causes the internal clock signal to clock the corresponding latch during the data eye of the corresponding digital comprises determining a phase shift that causes each internal clock signal to clock the corresponding latch in approximately the center of the data eye of the corresponding digital signal.

16. The method of claim 14 wherein placing the packetized memory device in the synchronization mode comprises capturing a FLAG signal and generating a calibration signal when the FLAG signal has a predetermined binary value for two consecutive captures.

17. The method of claim 14 wherein determining respective final phase shifts for the internal clock signals comprises:
evaluating the digital signals stored in each latch responsive to the associated internal clock signal to determine if the stored digital signals have expected values;
identifying each phase of the respective internal clock signals that caused the associated latch to store the corresponding digital signal having the expected values; and
selecting a phase for each of the internal clock signals from one of the phases that caused the associated latch to store the digital signal having the expected values.

18. The method of claim 17 wherein evaluating the digital signals stored in each latch to determine if the stored digital signals have the expected values through selecting a phase for each of the internal clock signals are performed sequentially on each of the internal clock signals until respective phases have been sequentially selected for every internal clock signal.

19. A method of capturing digital signal packets applied to a packetized memory device, each digital signal packet including at least one packet word containing a plurality of digital signals, comprising:
placing the packetized memory device in a synchronization mode of operation;
repetitively applying packet words having expected values to the packetized memory device;
generating a plurality of internal clock signals responsive to an external clock signal, each internal clock signal having a phase relative to an associated digital signal in the applied packet words;
storing in the packetized memory device each of the digital signals in a plurality of packet words responsive to different phases of the associated internal clock signals;
evaluating the stored digital signals to determine if the stored digital signals have the expected values;
identifying the phases of each internal clock signal that caused the associated digital signal having the expected values to be stored;

selecting a phase for each of the internal clock signals from among the phases that caused the digital signal having the expected values to be stored;

adjusting the phase of each of the internal clock signals to the corresponding selected phase; and storing each of the digital signals in applied packet words packets responsive to the associated internal clock signal having the selected phase.

20. The method of claim 19 wherein repetitively applying digital signals having expected values to the packetized memory device occurs before placing the packetized memory device in a synchronization mode of operation.

21. The method of claim 19 wherein evaluating the stored digital signals to determine if the stored digital signals have the expected values comprises generating expected values for each of the stored digital signals from the stored values for a selected one of the digital signals and comparing the stored digital signals to their respective values.

22. The method of claim 19 wherein repetitively applying digital signal packets having expected values to the packetized memory device comprises applying a 15 bit pseudo-random bit sequence for each of the digital signals in the applied digital signal packets.

23. The method of claim 22 wherein the 15 bit pseudo-random bit sequence comprises the repeating bit sequence of "111101011001000."

24. The method of claim 19 wherein storing in the packetized memory device each of the digital signals in a plurality of packet words responsive to different phases of the associated internal clock signals comprises storing groups of each applied digital signal responsive to sixteen phases of the associated internal clock signal.

25. The method of claim 24 wherein each group comprises four sequentially stored digital signals, a plurality of groups being stored at each phase of the associated internal clock signal, and a respective phase being identified as causing digital signals to be stored having the expected values when every group of digital signals has its corresponding expected values.

26. A synchronization circuit for capturing digital signal packets applied to a packetized memory device, each digital signal packet including at least one packet word including a plurality of digital signals applied to respective latches in the packetized memory device, comprising:

a clock generator circuit generating a plurality of internal clock signals on respective outputs responsive to an external clock signal, each internal clock signal having a corresponding phase relative to the external clock signal;

a plurality of selection circuits, each selection circuit having inputs coupled to respective outputs of the clock generator circuit and having an output coupled to a clock terminal of an associated latch, the selection circuit coupling a selected input to its output responsive to a phase command signal;

an evaluation circuit coupled to receive a plurality of digital signals sequentially stored in a selected one of the latches, and generating a results signal indicating whether each of the digital signals has an expected value; and a control circuit coupled to the evaluation circuit and the selection circuits, the control circuit sequentially selecting the latches and operable for each selected latch to adjust the phase command signals applied to the selection circuit coupled to the selected latch, store results signals received from the evaluation circuit at respective phase command signals, and generate a final phase command signal from the stored results signals, the control circuit applying each final phase command signal to the corresponding selection circuit to capture respective digital signals in subsequently applied packet words responsive to the internal clock signals having respective phases corresponding to the respective final phase command signals.

27. The circuit of claim 26 wherein the evaluation circuit compares each of the received digital signals to a predetermined value, and the results signal indicates whether each of the digital signals has the corresponding predetermined value.

28. The circuit of claim 26 wherein the control circuit generates the predetermined expected values for the digital signals stored in the selected latch and applies these predetermined expected values to the evaluation circuit.

29. The circuit of claim 26 wherein each of the selection circuits comprises a multiplexer having sixteen inputs adapted to receive respective internal clock signals, an output, and four control terminals adapted to receive respective phase command signals.

30. The circuit of claim 26 wherein the clock generator circuit comprises a clock generator adapted to receive the external clock signal and generate a clock signal responsive to the external clock signal, and a delay-locked loop circuit coupled to the clock generator that generates the plurality of internal clock signals on respective outputs responsive to the clock signal from the clock generator.

31. A synchronization circuit, comprising:

a plurality of latches, each latch receiving a respective digital signal in an applied packet word including a plurality of digital signals, and storing the received digital signal responsive to a clock signal applied on a clock terminal;

a plurality of selection circuits, each selection circuit having a plurality of inputs and having an output coupled to the clock terminal of an associated latch, the selection circuit coupling a selected input to its output responsive to a phase command signal;

a clock generator circuit generating a plurality of internal clock signals on respective outputs responsive to an external clock signal, each internal clock signal having a corresponding phase shift relative to the external clock signal;

an evaluation circuit coupled to receive a plurality of digital signals sequentially stored in a selected one of the latches, and generating a results signal indicating whether each of the digital signals has an expected value; and a control circuit coupled to the evaluation circuit and the selection circuits, the control circuit sequentially selecting the latches and operable for each selected latch to adjust the phase command signals applied to the associated selection circuit, store results signals received from the evaluation circuit at respective phase command signals, and generate a final phase command signal from the stored results signals, the control circuit applying each final phase command signal to the corresponding selection circuit to thereby adjust the phase shift of the clock signal applied to each latch relative to the corresponding digital signal applied to the latch.

32. The synchronization circuit of claim 31 wherein each of the digital signals has a data eye and the phase shift of the clock signal applied to each latch causes the latch to store the corresponding digital signal at approximately a center of the data eye.

33. The synchronization circuit of claim 31 wherein the evaluation circuit compares each of the received digital signals to a predetermined value, and the results signal indicates whether each of the digital signals has the corresponding predetermined value.

34. The synchronization circuit of claim 31 wherein the control circuit generates the predetermined expected values for the digital signals stored in the selected latch and applies these predetermined expected values to the evaluation circuit.

35. The synchronization circuit of claim 31 wherein each of the selection circuits comprises a multiplexer having sixteen inputs to receive respective internal clock signals, an output, and four control terminals to receive respective phase command signals.

36. A synchronization circuit, comprising:

a plurality of latches coupled to respective lines of a bus, each latch receiving a respective digital signal applied on the corresponding bus line and storing the received digital signal responsive to a clock signal applied on a clock terminal;

a plurality of selection circuits, each selection circuit having a plurality of inputs and having an output coupled to the clock terminal of an associated latch, the selection circuit coupling a selected input to its output responsive to a phase command signal;

a clock generator circuit generating a plurality of internal clock signals on respective outputs responsive to an external clock signal, each internal clock signal having a corresponding phase shift relative to the external clock signal;

an evaluation circuit coupled to receive a plurality of digital signals sequentially stored in a selected one of the latches, and generating a results signal indicating whether each of the digital signals has an expected value; and a control circuit coupled to the evaluation circuit and the selection circuits, the control circuit sequentially selecting the latches and operable for each selected latch to adjust the phase command signals applied to the associated selection circuit, store results signals received from the evaluation circuit at respective phase command signals, and generate a final phase command signal from the stored results signals, the control circuit applying each final phase command signal to the corresponding selection circuit to thereby adjust the phase shift of the internal clock signal applied to each latch relative to the digital signal on the corresponding bus line.

37. The synchronization circuit of claim 36 wherein each of the digital signals has a data eye and the phase shift of the clock signal applied to each latch causes the latch to store the corresponding digital signal at approximately a center of the data eye.

38. The synchronization circuit of claim 36 wherein the evaluation circuit compares each of the received digital signals to a predetermined value, and the results signal indicates whether each of the digital signals has the corresponding predetermined value.

39. The synchronization circuit of claim 36 wherein the control circuit generates the predetermined expected values for the digital signals stored in the selected latch and applies these predetermined expected values to the evaluation circuit.

40. The synchronization circuit of claim 36 wherein each of the selection circuits comprises a multiplexer having sixteen inputs to receive respective internal clock signals, an output, and four control terminals to receive respective phase command signals.

41. A packetized dynamic random access memory, comprising:

a clock generator circuit generating a plurality of internal clock signals on respective outputs responsive to an external clock signal, each internal clock signal having a corresponding phase relative to the external clock signal;

at least one array of memory cells to store data at a location determined by a row address and a column address;

a row address circuit to receive and decode the row address, and select a row of memory cells corresponding to the row address responsive to a first set of command signals;

a column address circuit to receive or apply data to one of the memory cells in the selected row corresponding to the column address responsive to a second set of command signals;

a data path circuit to couple data packets between an external data bus and the column address circuit responsive to a third set of command signals;

a command buffer receiving command packets and initialization packets having expected values, each packet including at least one packet word, and the command buffer including a plurality of latches that store respective bits of the received packets responsive to transitions of respective internal clock signals, the command buffer further generating respective command words and initialization words corresponding to each received command packet and initialization packet, respectively; and a synchronization circuit for capturing applied command and initialization packets, comprising, a plurality of selection circuits, each selection circuit having inputs coupled to respective outputs of the clock generator circuit and having an output coupled to a clock terminal of an associated latch in the command buffer, the selection circuit coupling a selected input to its output responsive to a phase command signal;

an evaluation circuit coupled to receive a plurality of digital signals sequentially stored in a selected one of the latches, and generating a results signal indicating whether each of the digital signals has an expected value; and a control circuit coupled to the evaluation circuit and the selection circuits to receive a synchronization signal, the control circuit operable when the synchronization signal goes active to sequentially select the latches and operable for each selected latch to adjust the phase command signals applied to the selection circuit coupled to the selected latch, store results signals sequentially received from the evaluation circuit at respective phase command signals, and generate a final phase command signal from the stored results signals, the control circuit applying each final phase command signal to the corresponding selection circuit to capture respective digital signals in subsequently applied packet words responsive to the internal clock signals having respective phases corresponding to the respective final phase command signals.

42. The packetized dynamic random access memory of claim 41 wherein the data path circuit comprises a plurality of latches that store respective data signals of received data packets applied on the data bus responsive to transitions of respective internal clock signals and the clock generator circuit further comprises an additional clock generator circuit that generates a plurality of internal clock signals on respective outputs responsive to a selected one of two external data clock signals, each internal clock signal applied to an associated latch in the data path circuit and having a corresponding phase relative to the selected external data clock signal, and the synchronization circuit further adjusting the phase of each internal clock signal relative to the corresponding data signal.

43. The packetized dynamic random access memory of claim 41 wherein the evaluation circuit compares each of the received digital signals to a predetermined value, and the results signal indicates whether each of the digital signals has the corresponding predetermined value.

44. The packetized dynamic random access memory of claim 41 wherein the control circuit generates the predetermined expected values for the digital signals stored in the selected latch and applies these predetermined expected values to the evaluation circuit.

45. The packetized dynamic random access memory of claim 41 wherein each of the selection circuits comprises a multiplexer having sixteen inputs to receive respective internal clock signals, an output, and four control terminals to receive respective phase command signals.

46. The packetized dynamic random access memory of claim 41 wherein the clock generator circuit comprises a clock generator to receive a command clock signal and generate a clock signal responsive to the command clock signal, and a delay-locked loop circuit coupled to the clock generator that generates the plurality of internal clock signals on respective outputs responsive to the clock signal from the clock generator.

47. A computer system, comprising:
a processor having a processor bus;
an input device coupled to the processor through the processor bus to allow data to be entered into the computer system;
an output device coupled to the processor through the processor bus to allow data to be output from the computer system; and
a packetized dynamic random access memory coupled to the processor bus, comprising,
a clock generator circuit generating a plurality of internal clock signals on respective outputs responsive to an external clock signal, each internal clock signal having a corresponding phase relative to the external clock signal;
at least one array of memory cells to store data at a location determined by a row address and a column address;
a row address circuit to receive and decode the row address, and select a row of memory cells corresponding to the row address responsive to a first set of command signals;
a column address circuit to receive or apply data to one of the memory cells in the selected row corresponding to the column address responsive to a second set of command signals;
a data path circuit to couple data packets between an external data bus and the column address circuit responsive to a third set of command signals;
a command buffer receiving command packets and initialization packets having expected values, each packet including at least one packet word, and the command buffer including a plurality of latches that store respective bits of the received packets responsive to transitions of respective internal clock signals, the command buffer further generating respective command words and initialization words corresponding to each received command and initialization packets, respectively; and
a synchronization circuit for capturing applied command and initialization packets, comprising,
a plurality of selection circuits, each selection circuit having inputs coupled to respective outputs of the clock generator circuit and having an output coupled to a clock terminal of an associated latch in the command buffer, the selection circuit coupling a selected input to its output responsive to a phase command signal;
an evaluation circuit coupled to receive a plurality of digital signals sequentially stored in a selected one of the latches, and generating a results signal indicating whether each of the digital signals has an expected value; and
a control circuit coupled to the evaluation circuit and the selection circuits to receive a synchronization signal, the control circuit operable when the synchronization signal goes active to sequentially select the latches and operable for each selected latch to adjust the phase command signals applied to the selection circuit coupled to the selected latch, store results signals sequentially received from the evaluation circuit at respective phase command signals, and generate a final phase command signal from the stored results signals, the control circuit applying each final phase command signal to the corresponding selection circuit to capture respective digital signals in subsequently applied packet words responsive to the internal clock signals having respective phases corresponding to the respective final phase command signals.

48. The computer system of claim 47 wherein the packetized dynamic random access memory is coupled directly to the processor bus.

49. The computer system of claim 47 wherein the data path circuit comprises a plurality of latches that store respective data signals of received data packets applied on the data bus responsive to transitions of respective internal clock signals and the clock generator circuit further comprises an additional clock generator circuit that generates a plurality of internal clock signals on respective outputs responsive to a selected one of two external data clock signals, each internal clock signal applied to an associated latch in the data path circuit and having a corresponding phase relative to the selected external data clock signal, and the synchronization circuit further adjusting the phase of each internal clock signal relative to the corresponding data signal.

50. The computer system of claim 47 wherein the evaluation circuit compares each of the received digital signals to a predetermined value, and the results signal indicates whether each of the digital signals has the corresponding predetermined value.

51. The computer system of claim 47 wherein the control circuit generates the predetermined expected values for the digital signals stored in the selected latch, and applies these predetermined expected values to the evaluation circuit.

52. The computer system of claim 47 wherein each of the selection circuits comprises a multiplexer having sixteen inputs to receive respective internal clock signals, an output, and four control terminals to receive respective phase command signals.

53. The computer system of claim 47 wherein the clock generator circuit comprises a clock generator to receive a command clock signal and generate a clock signal responsive to the command clock signal, and a delay-locked loop circuit coupled to the clock generator that generates the plurality of internal clock signals on respective outputs responsive to the clock signal from the clock generator.

54. A synchronization circuit for capturing digital signal packets applied to the packetized memory device, each digital signal packet including at least one packet word including a plurality of digital signals applied to respective latches in the packetized memory device, comprising:
   a clock generator including an input and a plurality of outputs, the clock generator developing a plurality of internal clock signals on respective outputs responsive to the external clock signal, each internal clock signal having a corresponding phase relative to the external clock signal;
   a plurality of selection circuits, each selection circuit having inputs coupled to respective outputs of the clock generator circuit and having an output coupled to a clock terminal of an associated latch, the selection circuit coupling a selected input to its output responsive to a phase command signal;
   an evaluation circuit having inputs coupled to receive a plurality of digital signals stored in a selected one of the latches, and having an output, the evaluation circuit coupling its output to a first voltage responsive to each of the digital signals having an expected value, and coupling its output to a second voltage responsive to any of the digital signals not having the expected value; and
   a control circuit coupled to the evaluation circuit and the selection circuits, the control circuit applying the digital signals stored in a selected one of the latches to the evaluation circuit, sequentially adjusting the phase command signal applied to the selection circuit coupled to the selected latch, and storing values output from the evaluation circuit responsive to the applied digital signals for each phase command signal, and thereafter generating a final phase command signal from the stored values output from the evaluation circuit, and the control circuit thereafter sequentially selecting each latch and determining a final phase command signal that is applied to the selection circuit coupled to the selected latch.

55. The circuit of claim 54 wherein the evaluation circuit compares each of the received digital signals to a predetermined value, and its output indicates whether each of the digital signals has the corresponding predetermined value.

56. The circuit of claim 55 wherein the control circuit generates predetermined expected values for the digital signals stored in the selected latch and applies these predetermined expected values to the evaluation circuit.

57. The circuit of claim 54 wherein each of the selection circuits comprises a multiplexer having sixteen inputs to receive respective internal clock signals, an output, and four control terminals to receive respective phase command signals.

58. The circuit of claim 54 wherein the clock generator circuit comprises a clock generator to receive the external clock signal and generate a clock signal responsive to the external clock signal, and a delay-locked loop circuit coupled to the clock generator that generates the plurality of internal clock signals on respective outputs responsive to the clock signal from the clock generator.

59. A bus capture circuit for capturing digital signals applied on respective lines of a bus, comprising:
   a plurality of latches, each latch having an input terminal coupled to a respective bus line, an output terminal, and a clock terminal, the latch being operable to latch a digital signal applied at the input terminal responsive to a clock signal applied to the clock terminal; and
   a clock generator operable to generate a plurality of internal clock signals, each internal clock signal being applied to the clock terminal of a respective latch, each clock signal having a respective phase that is determined independently of the phases of the other clock signals as a function of the digital signal applied to the latch.

60. The bus capture circuit of claim 59 further comprising an evaluation circuit having an input terminal coupled to the output terminal of each one of the latches at different times, the evaluation circuit receiving a plurality of digital signals captured by each latch at different times using different phases of the respective clock signal applied to the clock terminal of the latch, the evaluation circuit being operable to select a clock phase on the basis of the received digital signals and cause the clock generator to apply a clock signal having the selected phase to the clock terminal of the respective latch.

61. The bus capture circuit of claim 59 wherein the clock generator comprises a phase-locked loop circuit to receive an external clock signal having a frequency, the phase-locked loop circuit generating an internal clock signal having a frequency greater than the frequency of the external clock signal, and the clock generator clocking each of the latches responsive to selected transitions of the internal clock signal.

62. The bus capture circuit of claim 59 wherein each of the digital signals has a data eye and the phase shift of the internal clock signal applied to each latch causes the latch to store the corresponding digital signal at approximately a center of the data eye.

63. The bus capture circuit of claim 59 wherein the digital signals applied on the bus comprise digital signal packets, each packet including at least one packet word and each packet word including N digital signals where N corresponds to the width of the bus.

64. The bus capture circuit of claim 59 wherein the clock generator generates the internal clock signals responsive to an external clock signal.

65. A bus capture circuit for capturing digital signals applied on respective lines of a bus, comprising:
   a plurality of latch groups, each latch group including a plurality of latches, and each latch in a respective group having an input terminal coupled to the same respective bus line, an output terminal, and a clock terminal, each latch being operable to latch a digital signal applied at the input terminal responsive to a clock signal applied to the clock terminal; and
   a clock generator coupled to the output terminals of the latches and operable to generate a plurality of internal clock signals, each internal clock signal being applied to the clock terminal of a respective latch in each of the latch groups and each clock signal having a respective phase relative to the digital signal applied on the corresponding bus line, the clock generator selecting one of the latches in each latch group that successfully captures the digital signal applied on the corresponding bus line and applying the output from each selected latch on a respective output terminal.

66. The bus capture circuit of claim 65 wherein the clock generator comprises a phase-locked loop circuit to receive an external clock signal having a frequency, the phase-locked loop circuit generating an internal clock signal having a frequency greater than the frequency of the external clock signal, and the clock generator clocking respective latches in each latch group responsive to different selected transitions of the internal clock signal.

67. The bus capture circuit of claim 65 wherein each of the digital signals has a data eye and the phase shift of the internal clock signal applied to the selected latch causes the selected latch to store the corresponding digital signal at approximately a center of the data eye.

68. The bus capture circuit of claim 65, further comprising an evaluation circuit having an input terminal coupled to the output terminal of each one of the latches in each group at different times, the evaluation circuit receiving a plurality of digital signals captured by each latch responsive to the respective clock signal applied to the clock terminal of the latch, the evaluation circuit being operable to determine whether a particular latch successfully captures the corresponding digital signal responsive to the applied clock signal on the basis of the received digital signals from the latch, and operable to determine independently for each group which of the latches in the group that successfully captured the digital signal should be selected and to cause the clock generator to select the corresponding latch.

69. The bus capture circuit of claim 65 wherein the digital signals applied on the bus comprise digital signal packets, each packet including at least one packet word and each packet word including N digital signals where N corresponds to the width of the bus.

70. A synchronization circuit for use in capturing digital signal packets each of which includes at least one packet word including a plurality of received digital signals, the synchronization circuit comprising a circuit including a plurality of circuit elements to which the digital signals are applied, the circuit elements storing a plurality of values that are indicative of the respective timing at which the digital signals are valid so that the values can be used by another circuit to capture the received signals at respective times.

71. The synchronization circuit of clam 70 further comprising an evaluation circuit to determine the stored values based on the timing at which each of the digital signals is received relative to a reference signal.

72. The synchronization circuit of claim 71 wherein the digital signals are indicative of respective phases of a clock signal used to strobe the digital signals.

73. The synchronization circuit of claim 71 wherein the digital signal packets comprise command packets.

74. A synchronization circuit for use in capturing digital signal packets each of which includes at least one packet word including a plurality of received digital signals, the synchronization circuit comprising:

a clock generator circuit generating a plurality of clock signals each of which is generated at a respective time corresponding to a respective value and is usable to strobe a corresponding digital signal; and a circuit coupled to the clock generator, the circuit storing and coupling to the clock generator circuit the values to control the respective timing of the clock signals.

75. The synchronization circuit of claim 74 further comprising an evaluation circuit to determine the stored values based on the timing at which each of the digital signals is received relative to a reference signal.

76. The synchronization circuit of claim 74 wherein the digital signal packets comprise command packets.

77. A memory device sequentially receiving digital signal packets each of which includes at least one packet word including a plurality of received digital signals, the memory device comprising a circuit including a plurality of circuit elements storing a respective one of a plurality of values that are indicative of the respective timing at which the digital signals are received by the circuit so that the values can be used by another circuit to process the received signals at respective times.

78. The memory device of clam 77 further comprising an evaluation circuit to determine the stored values based on the timing at which each of the digital signals is received relative to a reference signal.

79. The memory device of claim 77 wherein the digital signals are indicative of respective phases of a clock signal that used to strobe the digital signals.

* * * * *

UNITED STATES PATENT AND TRADEMARK OFFICE
CERTIFICATE OF CORRECTION

PATENT NO.   : 6,374,360 B1
DATED        : April 16, 2002
INVENTOR(S)  : Brent Keeth, Terry R. Lee, Kevin Ryan and Troy A. Manning It is certified that error appears in the above-identified patent and that said Letters Patent is hereby corrected as shown below:

<u>Column 22,</u>
Line 11, reads "lease" should read -- least --

<u>Column 24,</u>
Line 16, reads "digital" should read -- digital signals --

Signed and Sealed this

Twenty-ninth Day of October, 2002

Attest:

Attesting Officer

JAMES E. ROGAN
Director of the United States Patent and Trademark Office